US010410034B2

(12) United States Patent
Strohmann et al.

(10) Patent No.: US 10,410,034 B2
(45) Date of Patent: Sep. 10, 2019

(54) ULTRASONIC BIOMETRIC SYSTEM WITH HARMONIC DETECTION

(71) Applicant: QUALCOMM Incorporated, San Diego, CA (US)

(72) Inventors: Jessica Liu Strohmann, Cupertino, CA (US); Yipeng Lu, Davis, CA (US); Ashish Hinger, Sunnyvale, CA (US); David William Burns, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 15/804,902

(22) Filed: Nov. 6, 2017

(65) Prior Publication Data

US 2018/0129849 A1 May 10, 2018

Related U.S. Application Data

(60) Provisional application No. 62/418,484, filed on Nov. 7, 2016.

(51) Int. Cl.
*G06K 9/20* (2006.01)
*G06K 9/00* (2006.01)
*G06F 21/32* (2013.01)

(52) U.S. Cl.
CPC ........... *G06K 9/0002* (2013.01); *G06F 21/32* (2013.01); *G06K 9/0012* (2013.01); *G06K 9/00026* (2013.01); *G06K 9/2018* (2013.01)

(58) Field of Classification Search
CPC . G06K 9/0002; G06K 9/00107–9/0012; G06F 21/32
See application file for complete search history.

(56) References Cited

U.S. PATENT DOCUMENTS 5,551,295 A 9/1996 Stockburger
7,751,594 B2 7/2010 Rowe et al.
(Continued)

FOREIGN PATENT DOCUMENTS

WO WO-2015134816 A1 * 9/2015 ........... G06K 9/0002

OTHER PUBLICATIONS

Tarantola, "Why is OLED Different and What Makes It So Great", from website https://gizmodo.com/why-is-oled-different-and-what-makes-it-so-great-1654102034, published on Nov. 6, 2014, 5 pages. (Year: 2014).*

(Continued)

*Primary Examiner* — Brian Werner
(74) *Attorney, Agent, or Firm* — Weaver Austin Villeneuve & Sampson LLP

(57) ABSTRACT

A system may include a fingerprint sensor system and a control system. The system may be configured to transmit an ultrasonic wave including a first frequency. The control system may be configured to obtain dermis layer image data from a target object based on reflected portions of the ultrasonic waves received by the fingerprint sensor system. The dermis layer image data may correspond to ultrasonic waves received from the target object within a time interval corresponding with the dermis layer. The reflected portions of the ultrasonic wave corresponding to the dermis layer image data may include ultrasonic waves at a second frequency that is an integer multiple of the first frequency. The control system may be configured to determine whether a magnitude of the ultrasonic waves at the second frequency exceeds a harmonic threshold and, if the magnitude exceeds the harmonic threshold, the control system may perform an authentication process.

28 Claims, 19 Drawing Sheets

(56) References Cited

U.S. PATENT DOCUMENTS

| | | |
|---|---|---|
| 9,195,879 B1 | 11/2015 | Du et al. |
| 9,424,456 B1 | 8/2016 | Kamath et al. |
| 9,721,138 B2 | 8/2017 | Hogan et al. |
| 2012/0177257 A1 | 7/2012 | Maev et al. |
| 2016/0117541 A1 | 4/2016 | Lu et al. |
| 2017/0140197 A1* | 5/2017 | Li .......................... G06F 21/32 |

OTHER PUBLICATIONS

International Search Report and Written Opinion—PCT/US2017/060441—ISA/EPO—dated Feb. 19, 2018.
Iula A., et al., "3D Ultrasonic Imaging of the Human Hand for Biometric Purposes", Ultrasonics Symposium (IUS), 2010 IEEE, IEEE, Oct. 11, 2010, pp. 37-40, XP031952714, DOI: 10.1109/ULTSYM.2010.5935577, ISBN: 978-1-45770382-9.

* cited by examiner

ULTRASONIC BIOMETRIC SYSTEM WITH HARMONIC DETECTION

PRIORITY CLAIM

This application claims priority to U.S. Provisional Patent Application No. 62/418,484, entitled "ULTRASONIC BIOMETRIC SYSTEM WITH HARMONIC ANALYSIS" and filed on Nov. 7, 2016, which is hereby incorporated by reference.

TECHNICAL FIELD

This disclosure relates to piezoelectric ultrasonic transducers and to electronic sensor arrays or interactive displays including ultrasonic transducers for biometric sensing, imaging, and touch or gesture recognition.

DESCRIPTION OF THE RELATED TECHNOLOGY

In an ultrasonic sensor system, an ultrasonic transmitter may be used to send an ultrasonic wave through an ultrasonically transmissive medium or media and towards an object to be detected. The transmitter may be operatively coupled with an ultrasonic sensor configured to detect portions of the ultrasonic wave that are reflected from the object. For example, in ultrasonic fingerprint imagers, an ultrasonic pulse may be produced by starting and stopping the transmitter during a very short interval of time. At each material interface encountered by the ultrasonic pulse, a portion of the ultrasonic pulse may be reflected.

For example, in the context of an ultrasonic fingerprint imager, the ultrasonic wave may travel through a platen on which a person's finger may be placed to obtain a fingerprint image or other fingerprint-related data, such as fingerprint minutiae or keypoints. A used herein, the term "finger" may refer to any digit, including a thumb. Accordingly, the term "fingerprint" as used herein includes thumbprints. As used herein the term "fingerprint image data" may refer to an actual image or to other fingerprint-related data, such as data corresponding to the types and locations fingerprint minutiae or keypoints. Such fingerprint image data may, for example, be in the form of a data structure that includes numerical values, such as values corresponding to signal strength (e.g., voltages). Accordingly, fingerprint image data may or may not be perceivable by a human as including an image, depending on the particular implementation. After passing through the platen, some portions of the ultrasonic wave encounter skin that is in contact with the platen, e.g., fingerprint ridges, while other portions of the ultrasonic wave encounter air, e.g., valleys between adjacent ridges of a fingerprint, and may be reflected with different intensities back towards the ultrasonic sensor. The reflected signals associated with the finger may be processed and converted to a digital value representing the signal strength of the reflected signal. When multiple such reflected signals are collected over a distributed area, the digital values of such signals may be used to produce a graphical display of the signal strength over the distributed area, for example by converting the digital values to an image, thereby producing an image of the fingerprint. Thus, an ultrasonic sensor system may be used as a fingerprint imager or other type of biometric scanner. In some implementations, the detected signal strength may be mapped into a contour map of the finger that is representative of the depth of the ridge structure detail.

SUMMARY

The systems, methods and devices of this disclosure each have several innovative aspects, no single one of which is solely responsible for the desirable attributes disclosed herein. Some innovative aspects of the subject matter described in this disclosure can be implemented in a system or an apparatus that includes a fingerprint sensor system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

The control system may be configured to transmit an ultrasonic wave using the fingerprint sensor system. The ultrasonic wave may include a first frequency. The control system may be configured to obtain dermis layer image data from a portion of a target object based on reflected portions of the ultrasonic wave received by the fingerprint sensor system. The dermis layer image data may correspond to ultrasonic waves received from the portion of the target object within a time interval corresponding with the dermis layer. The reflected portions of the ultrasonic wave that correspond to the dermis layer image data may include ultrasonic waves at a second frequency that is an integer multiple of the first frequency.

According to some examples, the control system may be configured to determine whether a magnitude of the ultrasonic waves at the second frequency exceeds a harmonic threshold. According to some examples, the control system may be configured to generate image information based, at least in part, on the ultrasonic waves at the second frequency. In some examples, if the control system determines that the magnitude exceeds the harmonic threshold, the control system may be configured to perform an authentication process that may be based, at least in part, on the dermis layer image data.

In some examples, the control system may be configured to obtain fingerprint image data based on reflected portions of the ultrasonic wave received by the fingerprint sensor system within a time interval corresponding with fingerprints. According to some implementations, the authentication process may be based, at least in part, on both the fingerprint image data and the dermis layer image data. In some examples, the control system may be configured to determine whether to unlock an electronic device based on an outcome of the authentication process.

According to some examples, the control system may be configured to estimate a material nonlinearity parameter value of the target object. The authentication process may be based, at least in part, on the material nonlinearity parameter value.

In some implementations, the control system may be configured to not perform the authentication process if the control system determines that the magnitude does not exceed the harmonic threshold. According to some such implementations, the control system may be configured to stop a fingerprint scanning process, at least temporarily, if the control system determines that the magnitude does not exceed the harmonic threshold.

According to some examples, the fingerprint sensor system may include a high-bandwidth ultrasonic sensor system responsive to a frequency range that corresponds to at least 1f Hertz (Hz) to 2f Hz. The 2f Hz frequency may be twice the 1f Hz frequency. The first frequency range may include the first frequency and the second frequency range may include the second frequency. In some examples, the fingerprint sensor system may include a bimodal narrow bandwidth ultrasonic sensor with a first frequency range including 1f Hz and a second frequency range including 2f Hz, while diminishing some frequencies between 1f Hz and 2f Hz.

In some implementations, the fingerprint sensor system may include a piezoelectric transmitter layer capable of transmitting the ultrasonic wave at the first frequency and a piezoelectric receiver layer capable of receiving ultrasonic waves at the second frequency. In some such implementations, a single piezoelectric layer may serve as the transmitter layer and as the receiver layer.

In some implementations, the control system may be configured to identify a peak time that corresponds to a peak reflecting signal. The time interval corresponding with the dermis layer may be a time interval of 0.0 to 7.5 microseconds after the peak time.

Other innovative aspects of the subject matter described in this disclosure may be implemented in a system that includes a control system and a fingerprint sensor system. According to some implementations, the control system may be configured to transmit a first ultrasonic wave using the fingerprint sensor system. The first ultrasonic wave may include a first frequency. In some such implementations, the control system may be configured to receive a portion of the first ultrasonic wave that may be reflected from a portion of a target object. The reflected portion of the first ultrasonic wave may include a second frequency that is an integer multiple of the first frequency. The control system may be configured to generate image information based, at least in part, on the reflected portion of the first ultrasonic wave at the second frequency.

In some examples, the system also may include a platen and an organic light-emitting diode (OLED) display stack residing between the platen and the fingerprint sensor system. The target object may be positioned on an outer surface of the platen.

According to some implementations, the control system may be further configured to transform data from a time domain into a frequency domain. For example, the control system may be configured to perform a fast Fourier transform to determine a magnitude of the received portion of the first ultrasonic wave at the second frequency.

In some instances, the first ultrasonic wave may have a first phase. The control system may be configured to transmit a second ultrasonic wave using the fingerprint sensor system. The second ultrasonic wave may include the first frequency. The second ultrasonic wave may have a second phase that is opposite from the first phase.

According to some examples, control system may be configured to obtain dermis layer image data from a portion of a target object based on reflected portions of the ultrasonic wave received by the fingerprint sensor system. The dermis layer image data may correspond to ultrasonic waves received from the portion of the target object within a time interval corresponding with the dermis layer. The reflected portions of the ultrasonic wave that correspond to the dermis layer image data may include ultrasonic waves at the second frequency.

According to some examples, the control system may be configured to determine whether a magnitude of the ultrasonic waves at the second frequency exceeds a harmonic threshold. In some such examples, if the control system determines that the magnitude exceeds the harmonic threshold, the control system may be configured to perform an authentication process that may be based, at least in part, on the dermis layer image data.

In some examples, the control system may be configured to obtain fingerprint image data based on reflected portions of the ultrasonic wave received by the fingerprint sensor system within a time interval corresponding with fingerprints. According to some implementations, the authentication process may be based, at least in part, on both the fingerprint image data and the dermis layer image data. In some examples, the control system may be configured to determine whether to unlock an electronic device based on an outcome of the authentication process.

In some implementations, the system may include an acoustic up-conversion layer positioned in an acoustic path of the fingerprint sensor system. According to some examples, an acoustic up-conversion layer may be included in the OLED display stack.

Other innovative aspects of the subject matter described in this disclosure may be implemented in a method. The method may involve transmitting an ultrasonic wave using a fingerprint sensor system. The ultrasonic wave may include a first frequency. The method may involve obtaining dermis layer image data from a target object based on reflected portions of the ultrasonic wave received by the fingerprint sensor system. The dermis layer image data may correspond to ultrasonic waves received from the target object within a time interval corresponding with the dermis layer. The reflected portions of the ultrasonic wave may correspond to the dermis layer image data include ultrasonic waves at a second frequency that is an integer multiple of the first frequency.

In some examples, the method may involve determining whether a magnitude of the ultrasonic waves at the second frequency exceeds a harmonic threshold and, if the magnitude exceeds the harmonic threshold, performing an authentication process. The authentication process may be based, at least in part, on the dermis layer image data.

According to some implementations, the method may involve obtaining fingerprint image data based on reflected portions of the ultrasonic wave received by the fingerprint sensor system within a time interval corresponding with a fingerprint. The authentication process may be based, at least in part, on both the fingerprint image data and the dermis layer image data.

In some implementations, the method may involve estimating a material nonlinearity parameter value of the target object. According to some such implementations, the authentication process may be based, at least in part, on the material nonlinearity parameter value.

In some examples, the method may involve generating image information based, at least in part, on the ultrasonic waves at the second frequency. In some instances, the time interval corresponding with the dermis layer may be a time interval of 0.5 to 8.0 microseconds after generating the ultrasonic wave.

Some or all of the methods described herein may be performed by one or more devices according to instructions (e.g., software) stored on non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in a non-transitory medium having software stored thereon.

For example, the software may include instructions for performing a method. The method may involve transmitting an ultrasonic wave using a fingerprint sensor system. The ultrasonic wave may include a first frequency. The method may involve obtaining dermis layer image data from a target object based on reflected portions of the ultrasonic wave received by the fingerprint sensor system. The dermis layer image data may correspond to ultrasonic waves received from the target object within a time interval corresponding with the dermis layer. The reflected portions of the ultrasonic wave may correspond to the dermis layer image data include ultrasonic waves at a second frequency that is an integer multiple of the first frequency.

In some examples, the method may involve determining whether a magnitude of the ultrasonic waves at the second frequency exceeds a harmonic threshold and, if the magnitude exceeds the harmonic threshold, performing an authentication process. The authentication process may be based, at least in part, on the dermis layer image data.

According to some implementations, the method may involve obtaining fingerprint image data based on reflected portions of the ultrasonic wave received by the fingerprint sensor system within a time interval corresponding with a fingerprint. The authentication process may be based, at least in part, on both the fingerprint image data and the dermis layer image data.

In some implementations, the method may involve estimating a material nonlinearity parameter value of the target object. According to some such implementations, the authentication process may be based, at least in part, on the material nonlinearity parameter value.

In some examples, the method may involve generating image information based, at least in part, on the ultrasonic waves at the second frequency. In some instances, the time interval corresponding with the dermis layer may be a time interval of 0.5 to 8.0 microseconds after generating the ultrasonic wave.

Other features, aspects, and advantages will become apparent from a review of the disclosure. Note that the relative dimensions of the drawings and other diagrams of this disclosure may not be drawn to scale. The sizes, thicknesses, arrangements, materials, etc., shown and described in this disclosure are made only by way of example and should not be construed as limiting.

DETAILED DESCRIPTION

Figure 1:
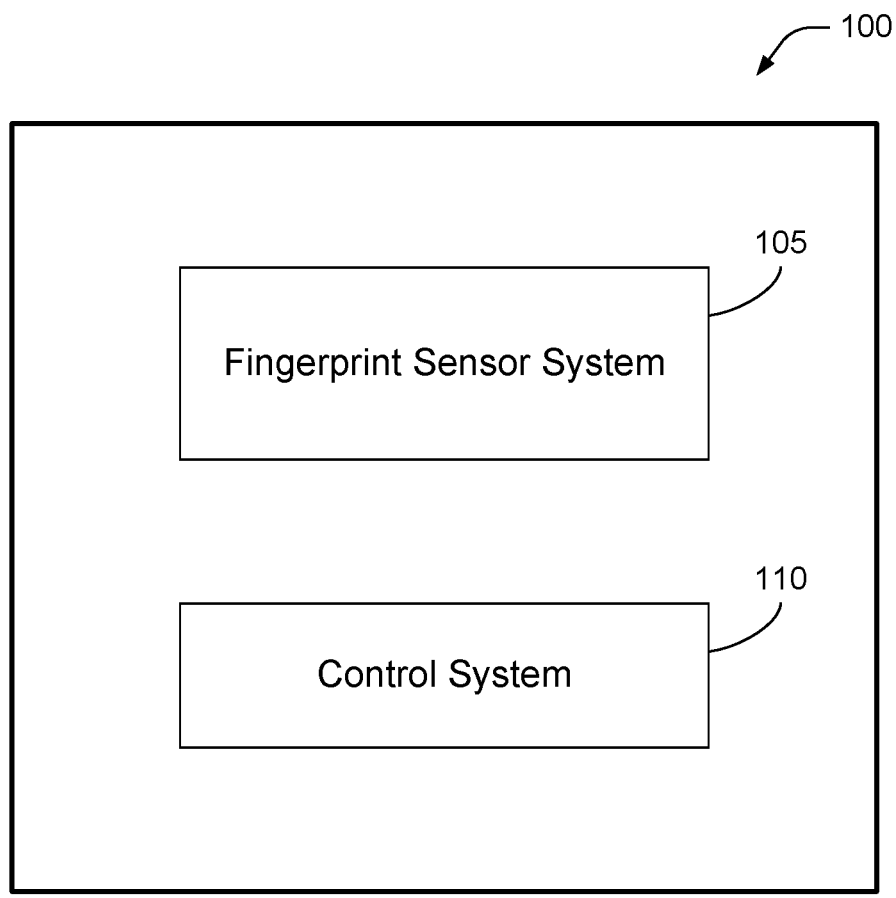
FIG. 1 is a block diagram that shows example components of an apparatus according to some implementations.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that includes a biometric system as disclosed herein for ultrasonic sensing. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands and patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, automatic teller machines (ATMs), parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Some biometric fingerprint sensor systems are used in electronic devices such as smartphones, electronic reading devices (e.g., e-readers), laptop computers, tablet computers, etc. The biometric fingerprint sensor systems may be used to generate fingerprint image data that may correspond with a fingerprint of a finger placed on a platen of the fingerprint sensor system. However, in some instances the "fingerprint image data" may not actually correspond with a fingerprint, but instead may correspond with fingerprint-like structures formed on a sleeve, a fake finger or another such target object. The fingerprint image data may then be analyzed, for example, by authenticating the corresponding fingerprint with an authenticated fingerprint (e.g., of the owner of the electronic device). If the fingerprint is authenticated, then the electronic device may be unlocked for use or a transaction may be authorized. As a result, biometric fingerprint sensor systems may be employed as part of a system to enhance the security of electronic devices. The security may be further enhanced by determining if the fingerprint corresponds to a real finger placed on the platen of the electronic device. For example, some fingerprints may be "spoofed" by generating fake (e.g., printed or embossed) fingerprints. This could result in the device unlocking without the consent of the owner.

Some biometric fingerprint sensor systems may be implemented to generate dermis layer image data representing bones, blood vessels, etc. within the dermis layer of the finger. That is, image data corresponding to features within a target object, such as a finger, can be generated in addition to, or instead of, fingerprint image data corresponding to a fingerprint having ridges and valleys upon a surface of the finger or other target object. In some instances the "dermis layer image data" may not actually be data obtained from the dermis layer of a finger, but instead may be data acquired from a non-finger target object at a depth, a time interval, etc., corresponding with the dermis layer of a finger. The dermis layer image data, or a combination of the dermis layer image data and the fingerprint image data, may be used to further enhance the security of an electronic device, for example, by determining that the fingerprint is from a live finger. As a result, the presence of the owner of the electronic device can be verified if the fingerprint is from a live finger of the owner.

The dermis layer image data may be generated based on an ultrasonic wave (or signal) that is transmitted into a finger or other target object. A portion of that transmitted ultrasonic wave may reflect back to the fingerprint sensor system. If the target object is a finger, the reflected signal may include information corresponding with features within the dermis layer of the finger. However, the reflected signal from the dermis layer of a finger is often small and may be difficult to detect among the electrical noise.

In some implementations, the reflected signal may be detected by implementing a sensor configured to be responsive to harmonic frequencies. For example, the transmitted ultrasonic signal may include a first frequency, which may be referred to herein as a fundamental frequency (e.g., "1f" Hertz (Hz)). As the transmitted ultrasonic signal propagates towards and into the finger, several reflected signals (e.g., reflected portions of the ultrasonic wave) may be generated due to components within the sensor (e.g., the platen and other layers), the epidermis (e.g., the outer layer of the skin), and the dermis layer. Often, the reflected signals from the sensor, the epidermis and the dermis are also at the fundamental frequency. However, the reflected signals from the dermis layer may include additional signals at a second frequency that is a positive integer multiple of the first frequency, for example, at twice the frequency of the first frequency or "2f" Hz (e.g., 20 MHz if the first frequency is 10 MHz). The second frequency also may be referred to herein as a harmonic frequency. That is, reflected signals from human tissue may include signals at twice the frequency of the frequency of the transmitted ultrasonic wave. As a result, by detecting reflected signals at a harmonic frequency from a target object at a time and/or depth corresponding with the dermis layer of a finger, the target object may be determined to be a live finger and higher resolution of imaged features in the target object may be attained whether combined or not combined with 1f image information.

FIG. 1 is a block diagram that shows example components of an apparatus according to some implementations. In this example, the apparatus 100 includes a fingerprint sensor system 105 and a control system 110 that is configured to communicate with the fingerprint sensor system 105. The control system 110 may be configured to communicate with the fingerprint sensor system 105 via wired communication and/or wireless communication. As used herein, the term "coupled to" includes being physically coupled for wired communication as well as being configured for wireless communication.

According to some implementations, the apparatus 100 may be, or may include, a wearable device. In other examples, the apparatus 100 may be a component of a mobile device. In still other examples, the apparatus 100 may be a component of an automobile interior, a component of a door handle, etc.

In some implementations, at least a portion of the fingerprint sensor system 105 and/or the control system 110 may be included in more than one apparatus. In some examples, a second device (such as a mobile device) may include some or all of the control system 110, but may not include the fingerprint sensor system 105. However, the control system 110 may nonetheless be configured to communicate with the fingerprint sensor system 105.

The control system 110 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 110 also may include (and/or be configured for communication with) one or more memory devices, such as one or more random access memory (RAM) devices, read-only memory (ROM) devices and/or other types of non-transitory media. Accordingly, the apparatus 100 may have a memory system that includes one or more memory devices, though the memory system is not shown in FIG. 1.

The control system 110 may be capable of performing, at least in part, the methods disclosed herein. In some examples, the control system 110 may be capable of performing some or all of the methods described herein according to instructions (e.g., software) stored on non-transitory media. For example, the control system 110 may be configured for controlling the fingerprint sensor system 105 and/or for receiving and processing data from at least a portion of the fingerprint sensor system 105, e.g., as described below.

In some examples, the fingerprint sensor system 105 may include an ultrasonic receiver array and an ultrasonic transmitter. Some examples of the ultrasonic receiver array are described below. According to some examples the ultrasonic transmitter may be an ultrasonic plane-wave generator, such as those described in more detail below. In some implementations the fingerprint sensor system 105 may include an array of ultrasonic transmitter elements, such as an array of piezoelectric micromachined ultrasonic transducers (PMUTs), an array of capacitive micromachined ultrasonic transducers (CMUTs), etc. Accordingly, in some implementations an ultrasonic receiver and an ultrasonic transmitter may be combined in an ultrasonic transceiver. For example, a piezoelectric receiver layer, PMUT elements in a single-layer array of PMUTs, or CMUT elements in a single-layer array of CMUTs may be used as an ultrasonic transmitter as well as an ultrasonic receiver. In some implementations, the fingerprint sensor system 105 may include an array of ultrasonic transducers configured to perform transmit-side beamforming, receive-side beamforming, or both transmit-side and receive-side beamforming.

Although not expressly shown in FIG. 1, some implementations of the apparatus 100 may include an interface system. In some examples, the interface system may include a wireless interface system. In some implementations, the interface system may include a network interface, an interface between the control system 110 and a memory system and/or an interface between the control system 110 and an external device interface (e.g., a port or an applications processor). In some examples, the interface system may include one or more user interfaces, such as a display, a touch screen, a microphone, etc.

Figure 2:
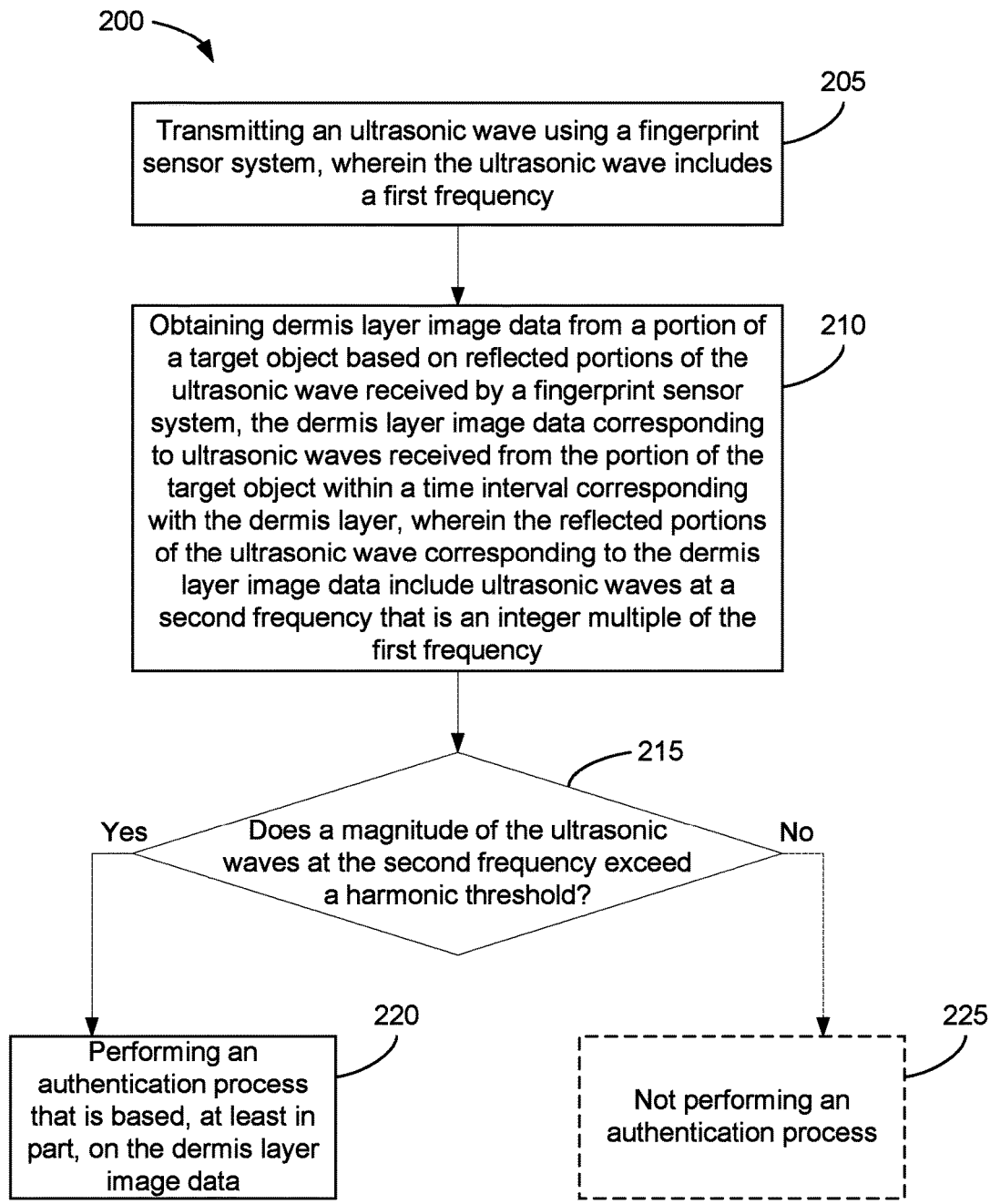
FIG. 2 is a flow diagram that provides examples of operations according to some disclosed methods.

FIG. 2 is a flow diagram that provides examples of operations according to some disclosed methods. The blocks of FIG. 2 (and those of other flow diagrams provided herein) may, for example, be performed by the apparatus 100 of FIG. 1, by a similar apparatus or by a system that includes one or more such devices. As with other methods disclosed herein, the method outlined in FIG. 2 may include more or fewer blocks than indicated. Moreover, the blocks of methods disclosed herein are not necessarily performed in the order indicated.

Here, block 205 involves generating and transmitting an ultrasonic wave. Block 205 may involve transmitting one or more ultrasonic waves by the fingerprint sensor system 105 shown in FIG. 1, or transmitting one or more ultrasonic waves by another fingerprint sensor system. The transmitting process may be controlled by a control system, such as the control system 110 of FIG. 1.

In this example, the ultrasonic wave(s) include a first frequency. For example, the ultrasonic wave(s) may include a range or band of frequencies that includes the first frequency. According to some examples, the first frequency may correspond to a frequency, or a frequency band, for a peak power of the transmitted ultrasonic wave(s).

According to this example, block 210 involves obtaining dermis layer image data from a target object based on reflected portions of the ultrasonic wave received by a fingerprint sensor system. The dermis layer "image data," like other image data disclosed herein, may or may not include data that is recognizable by a human being as including an image. Such image data may, for example, be in the form of a data structure that includes numerical values, such as numerical values corresponding to voltages. A target object such as a finger may be positioned on an outer surface of a platen associated with the fingerprint sensor system to obtain fingerprint image data and/or dermis layer image data.

The dermis layer image data may correspond to ultrasonic waves received from the target object within a time interval corresponding with the dermis layer. For example, the time interval corresponding with the dermis layer may be a time interval during which ultrasonic waves reflected from the dermis layer of a finger would normally be received. This time may depend, for example, on a typical depth from the surface of a finger to the dermal layer, on the thickness of materials of the ultrasonic sensor system through which the ultrasonic waves would pass when traveling from an ultrasonic transmitter to an ultrasonic receiver through various layers of the ultrasonic sensor system, through the platen and other layers in the acoustic path, through portions of the target object, and back. In some examples, the time interval corresponding with the dermis layer may be a time interval in the range of 0.5 to 8.0 microseconds after the generation of the ultrasonic waves.

Some implementations may involve identifying (e.g., by a control system) a peak time corresponding to a peak reflecting signal. The peak time may, for example, correspond with one or more reflections from fingerprint ridge areas or fingerprint valley areas. According to some such implementations, the time interval corresponding with the fingerprint ridge and valley areas may be a time interval in the range of 0.5 to 2.0 microseconds after the generation of the ultrasonic waves. The time interval corresponding to features within the dermis layer may correspond to a time interval in the range of 0.0 to about 7.5 microseconds after the peak reflecting signal is received.

In the example described in block 210, the reflected portions of the ultrasonic wave corresponding to the dermis layer image data may include ultrasonic waves at a second frequency that is an integer multiple of the first frequency. As described in more detail below, some disclosed implementations may involve enhancing signals at the second frequency and/or suppressing signals at the first frequency, e.g. by applying a notch filter, a bandpass filter that passes signals at the second frequency, signal processing and reproduction, etc.

According to this implementation, block 215 involves determining whether a magnitude of the ultrasonic waves at the second frequency exceeds what may be referred to herein as a "harmonic threshold." The harmonic threshold may, for example, be a voltage threshold, a power threshold, a signal-to-noise ratio (SNR), an image quality factor, a material nonlinearity parameter, etc., corresponding to the ultrasonic waves at the second frequency.

In this example, if it is determined in block 215 that the magnitude exceeds the harmonic threshold, the process continues to block 220. Here, block 220 may involve performing an authentication process that is based, at least in part, on the dermis layer image data. The authentication process may, for example, involve comparing the dermis layer image data with previously-acquired dermis layer image data. Accordingly, some implementations may be capable of performing authentication processes that are based, at least in part, on sub-epidermal features. As used herein, the term "sub-epidermal features" may refer to any of the tissue layers that underlie the epidermis, including the dermis, the papillary layer, the reticular layer, the subcutis, etc., and any blood vessels, lymph vessels, sweat glands, hair follicles, hair papilla, fat lobules, muscle tissue, bone material, etc. In some examples, the user authentication process may involve comparing "attribute information"

obtained from received image data, based on the signals from an ultrasonic sensor system, with stored attribute information obtained from image data that has previously been received from an authorized user during an enrollment process. In some implementations the attribute information obtained from the received image data and the stored attribute information may include information regarding bone tissue features, muscle tissue features and/or sub-epidermal tissue features. The attribute information obtained from the received image data and the stored attribute information that are compared during an authentication process may include biometric template data corresponding to the received image data and biometric template data corresponding to the stored image data. Biometric template data corresponding to sub-epidermal features may include attribute information regarding the types (e.g., the sizes, shapes, orientations, etc.) and locations of features of the dermis, features of the subcutis, lymph vessel features, sweat gland features, hair follicle features, hair papilla features, fat lobule features, muscle tissue and/or bone material. According to some examples, a control system may be configured to determine whether to unlock an electronic device based on an outcome of the authentication process.

In the example shown in FIG. 2, if it is determined in block 215 that the magnitude does not exceed the harmonic threshold, the process may continue to block 225 and the authentication process of block 220 is not performed. For example, a control system may be configured to not perform the authentication process if the control system determines that the magnitude does not exceed the harmonic threshold. In some examples, block 225 may involve making a determination that the target object is not a living finger. In some such examples, block 225 may involve providing an indication (e.g., via an interface of the apparatus 100, such as a user interface) that the target object is a spoof.

According to some implementations, if a control system determines in block 215 that the magnitude exceeds the harmonic threshold, the control system may be configured to obtain fingerprint image data. In some such examples, the authentication process of block 220 may be based, at least in part, on both the fingerprint image data and the dermis layer image data. In such examples, the authentication process may involve evaluating attribute information obtained from the fingerprint image data. In some implementations, the attribute information may include fingerprint minutiae or keypoint information. The biometric template data may include fingerprint template data, which may indicate types and locations of fingerprint minutia or keypoints. A user authentication process based on attributes of fingerprint image data may involve comparing received and stored fingerprint template data. Such a process may or may not involve directly comparing received and stored fingerprint image data.

The fingerprint image data may be based on portions of the ultrasonic wave reflected from a target object and received by the fingerprint sensor system within a time interval corresponding with fingerprints. The time interval corresponding with fingerprints will generally be less than the time interval corresponding with the dermis layer. In some examples, the time interval corresponding with fingerprints may be less than 0.5 microseconds. In some examples, the time interval corresponding with receiving fingerprint image information may be in a range between about 0.5 microseconds and about 2.0 microseconds. In some implementations that include an OLED display in the sensor stack, fingerprint image data may be received in a time interval within a range between about 1.0 and 2.0 microseconds. According to some examples, the time interval corresponding with fingerprints may be determined with reference to an expected time for reflections from a platen surface to be received by the fingerprint sensor system.

According to some examples, a control system may be configured to estimate a material nonlinearity parameter value related to portions of the target object that may be based on the harmonic signal strength detected by an ultrasonic biometric sensor. According to some implementations, the ultrasonic sensor may be a component of a mobile device. The strength of the harmonic (2f) signal provides an indication of the material nonlinearity. Human tissues have material nonlinearity parameter values within a predictable range of values. For example, nonfat human tissues generally have material nonlinearity parameter values within a range of 5.6 to 6.6, whereas some materials commonly used for artificial fingers have material nonlinearity parameter values in the range of 9.8 to 11.1. In some implementations, the material nonlinearity parameter for a portion of the target object may be determined by comparing the signal strength of the 2f signal to the signal strength of the 1f signal acquired from the portion of the target object. For example, a material with high elastic nonlinearity may have a significant value of the ratio between the 2f signal strength and the 1f signal strength, whereas a material with low elastic nonlinearity may have a diminished value of the 2f/1f signal strength. Diminished values of the 2f/1f signal strength may be less than about one percent, whereas in some implementations, a material with a high elastic nonlinearity may have a 2f/1f signal strength of larger than about five percent. In some implementations, the material nonlinearity parameter may be directly proportional to the ratio between the 2f signal strength and the 1f signal strength. The dermis layer image data may be analyzed accordingly to determine one or more material nonlinearity parameter values, and a determination made whether the values correspond to a live finger or a spoof finger. Therefore, in some examples an authentication process and/or an associated liveness detection process may be based, at least in part, on the material nonlinearity parameter value. The material nonlinearity parameter value for a real finger may reside in a predetermined biometric range, whereas the material nonlinearity parameter value for a fake finger may have a value above or below the predetermined biometric range. In some implementations, the authentication process of block 220 may be based, at least in part, on the material nonlinearity parameter value. According to some implementations the determination of block 215 may be based, in part, on the material nonlinearity parameter value.

According to some implementations, received signals at the second frequency, or at other integer multiples of the first frequency, may be used to generate image information corresponding to the dermal layer or other layers of a finger.

Figure 3A:
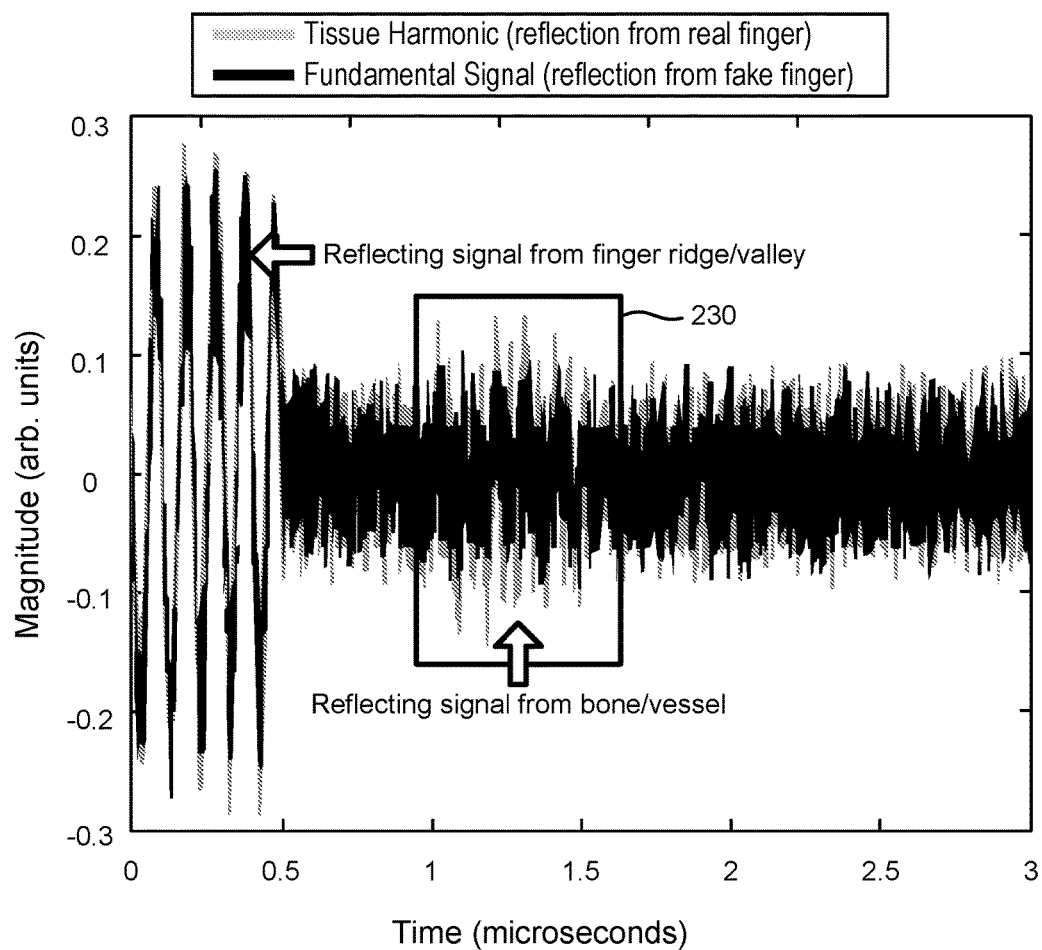
FIG. 3A shows an example of signals corresponding to the dermis layer of a finger.

FIG. 3A shows an example of signals corresponding to the dermis layer of a finger. In FIG. 3A, reflections of the ultrasonic wave as received by a fingerprint sensor system (e.g., as received by a receiver of a piezoelectric ultrasonic transducer) may be converted to electrical signals. For example, as the reflected waves propagate back to the piezoelectric ultrasonic transducer, a receiver made of piezoelectric material may be configured to convert the reflected waves into electrical signals due to the deformation of the piezoelectric material in response to the reflected waves.

In FIG. 3A, acquisition time window 230 represents at least a portion of a time interval corresponding with a dermis layer, during which reflected signals from the dermis layer of an actual finger would reach the receiver. As a result, a controller (e.g., circuits, other hardware components, and/or software) of the fingerprint sensor system may sample the electrical signals generated by the receiver during the corresponding acquisition time window. For example, reflections from the dermis layer may generally be within a 0.5 microsecond to 8 microsecond time range after generating and transmitting the ultrasonic wave. In the example shown in FIG. 3A, the time interval corresponding with the dermis layer is following the time from 0 to 0.5 microseconds in which the reflected signals may be from the finger ridges and valleys corresponding to a fingerprint, with signals received after about 0.5 microseconds corresponding to reflected signals within the dermal layer.

As a result, dermis layer image data may be generated and stored in memory of a control system or a memory that is accessible to the control system. Since the data corresponding to FIG. 3A is in the time domain, the portions of the reflected signals corresponding to the dermis layer may be difficult to detect among the noise. The signals corresponding to the dermis layer may be relatively small, for example, on the order of 8% of the magnitude of the transmitted ultrasonic wave.

In addition, it may be difficult to differentiate, in the time domain, reflections corresponding to a first transmitted frequency (examples of which are shown in black in FIG. 3A) from reflections corresponding to an integer multiple of the first transmitted frequency (examples of which are shown in gray in FIG. 3A). Accordingly, some disclosed methods may involve converting signals received by a fingerprint sensor system from the time domain into the frequency domain. For example, by employing a fast Fourier transform (FFT), the dermis layer image data in the time domain may be converted into the frequency domain.

Figure 3B:
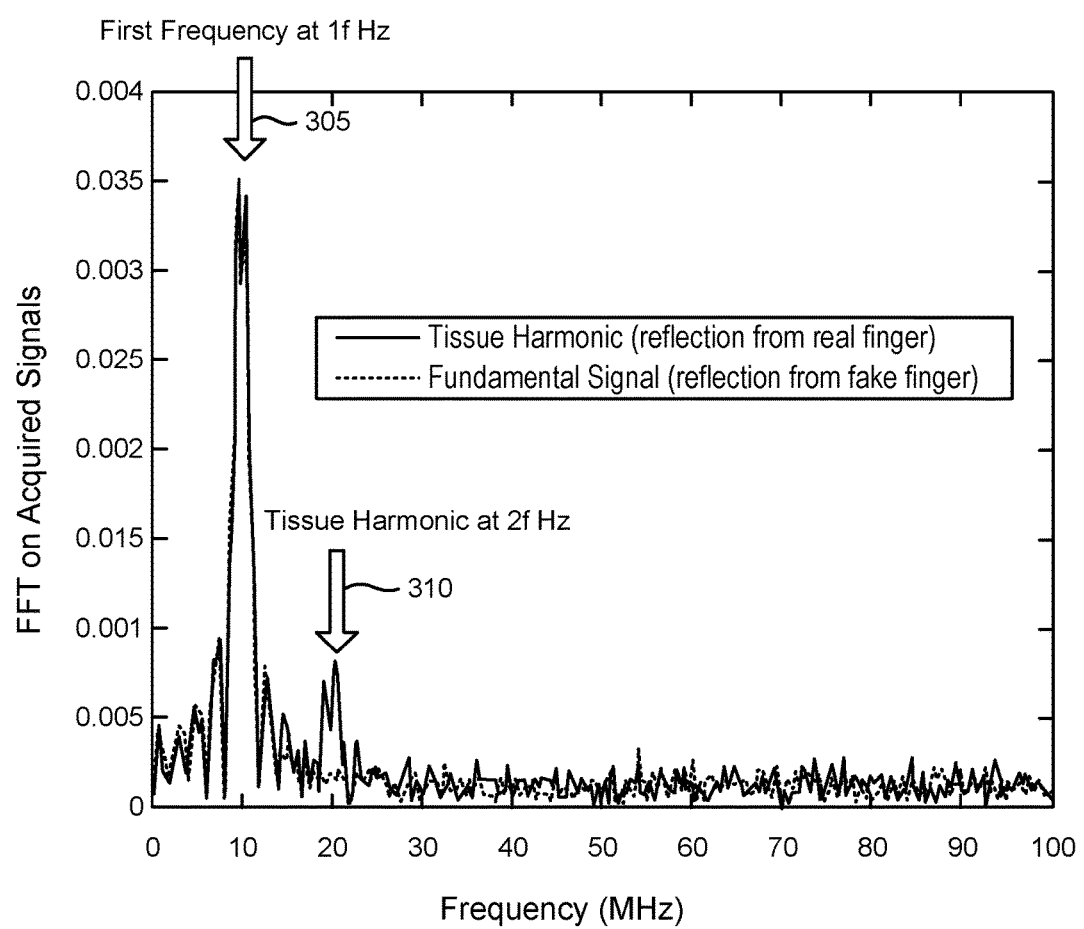
FIG. 3B shows an example of signals converted into the frequency domain.

FIG. 3B shows an example of signals converted into the frequency domain. In this example signals corresponding to a first frequency, which is also referred to in FIG. 3B as a fundamental frequency, are shown in stippled lines. Signals corresponding to a second frequency that is an integer multiple of the first frequency are shown in solid lines. In FIG. 3B and elsewhere herein, signals corresponding to the second frequency, or corresponding to other integer multiples of the first frequency, may also be referred to as "harmonic" signals. As depicted in FIG. 3B, the presence of a frequency component 310 at 2f Hz, which is an integer multiple of the first frequency 305 at 1f Hz, may indicate a feature of the dermis layer of the finger. That is, if the magnitude of the frequency component 310 at 2f Hz is above a threshold magnitude, this may indicate a harmonic due to the dermis layer and may therefore represent a feature (e.g., bone, blood vessel, etc.) within a live finger. For example, as depicted in FIG. 3B, the 1f frequency corresponds to about 10 MHz while the 2f frequency corresponds to about 20 MHz.

According to some implementations, a fingerprint sensor system may include a high-bandwidth ultrasonic sensor system responsive to a frequency range corresponding to at least 1f Hertz (Hz) to 2f Hz or a bimodal narrow-bandwidth ultrasonic sensor with a first frequency range including 1f Hz and a second frequency range including 2f Hz, while diminishing some frequencies between 1f Hz and 2f Hz. In some such examples, the first frequency range includes the first frequency described above with reference to FIG. 2 and the second frequency range includes the second frequency described above with reference to FIG. 2. According to some such examples, the first frequency may correspond to 1f and the second frequency may correspond to 2f.

Figure 4A:
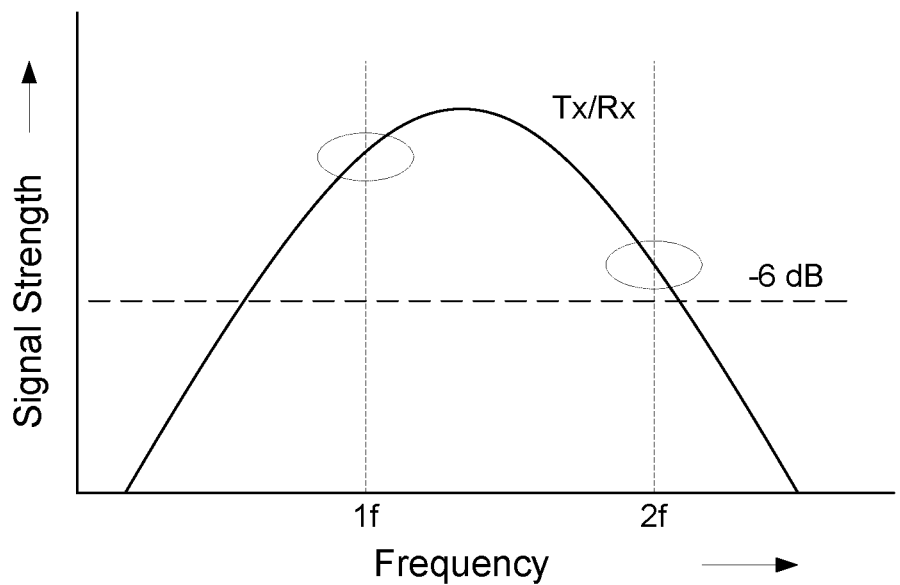
FIGS. 4A, 4B, 4C and 4D show examples of bandwidth range and sensor response for some ultrasonic fingerprint systems.

FIGS. 4A, 4B, 4C and 4D show examples of bandwidth range and sensor response for some ultrasonic fingerprint systems. FIG. 4A shows an ultrasonic sensor system with a relatively high bandwidth that may operate over a relatively wide frequency range including 1f Hz and 2f Hz. According to some implementations, operating points for 1f Hz and 2f Hz may be selected in regions of the sensor response curve where the sensor response is less than about 6 dB (half power point) down from the peak response of the sensor system. In some examples, the 1f frequency may be within a range between about 5 MHz and about 20 MHz such as 10 MHz and the 2f frequency may be within a range between about 10 MHz and 40 MHz such as 20 MHz. In some implementations, the sensor system may include a transmitter portion that is separate from a receiver portion. For example, the transmitter may be driven with a signal at 1f Hz and the receiver may be responsive to signals at one or both of 1f Hz and 2f Hz such that it may "pick up" or be responsive to signals at 2f Hz. This may result in dermis layer image data having better contrast and resolution. As noted below, similar results may be obtained if the fingerprint sensor system includes an array of PMUTs or CMUTs. Accordingly, in some such implementations a control system may be configured to generate image information that is based at least in part on received ultrasonic waves at a second frequency, which may be 2f Hz or another integer multiple of the first frequency.

Figure 4B:
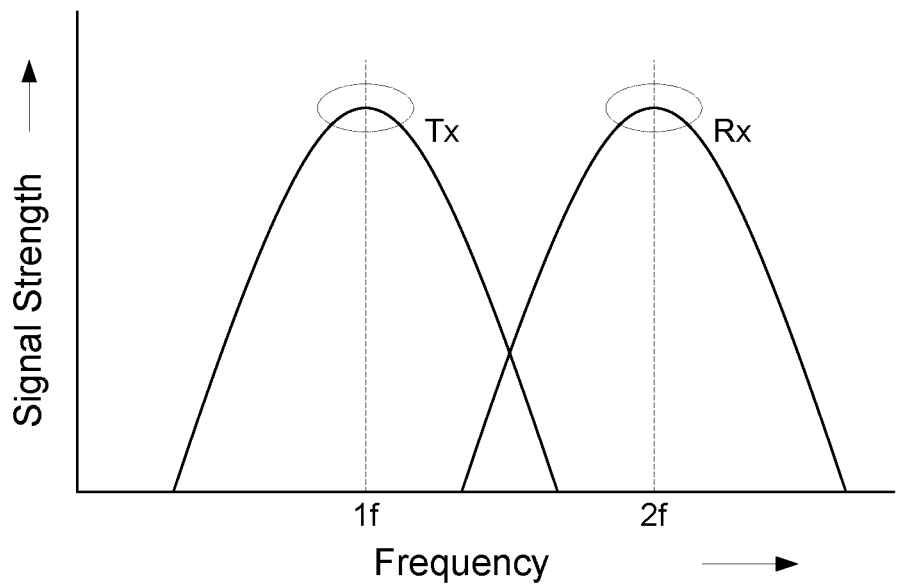
Figure 4C:
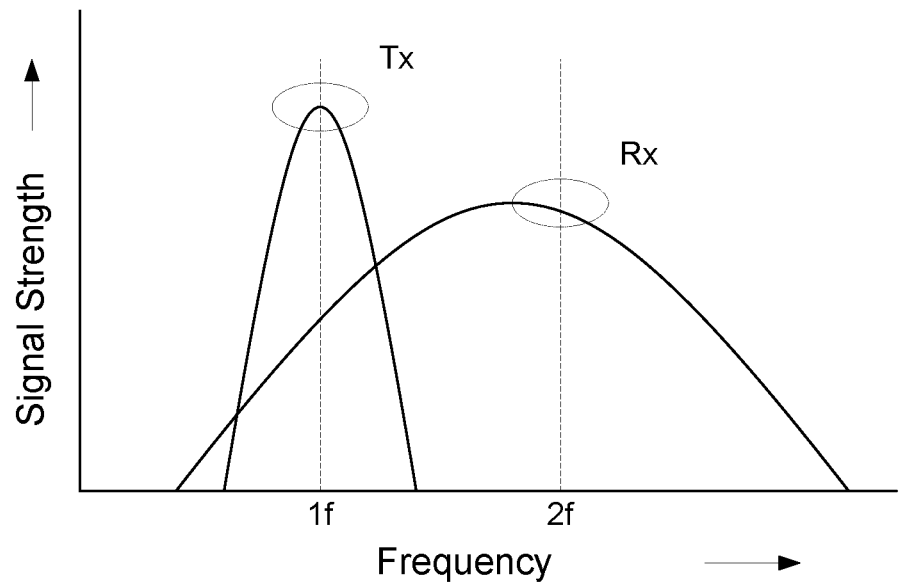
Figure 4D:
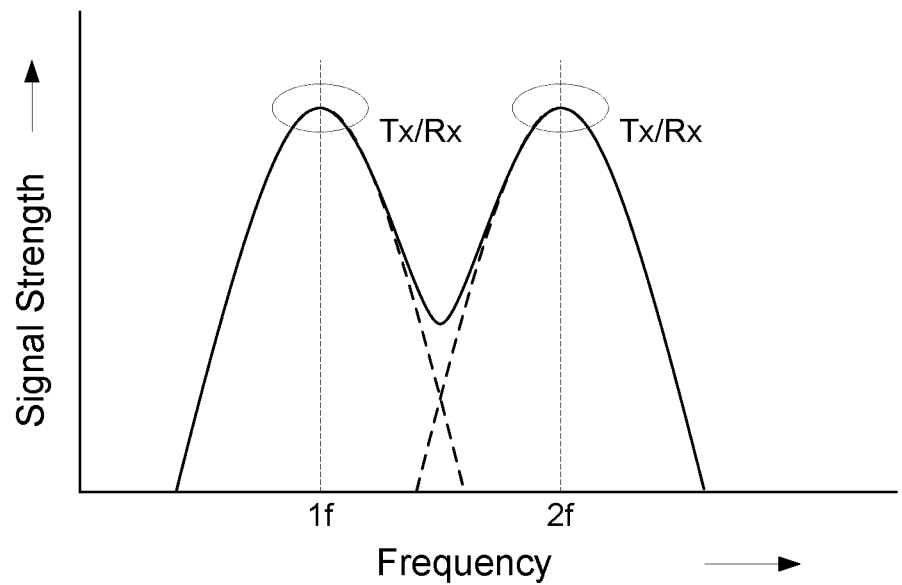

FIG. 4B shows a bimodal distribution of the responsiveness of an ultrasonic sensor system with a transmitter portion separate from a receiver portion. Separate transmitters and receivers allow each portion to be tuned to operate in a highly responsive region near the desired transmit and receive frequencies, respectively. For example, the transmitter (Tx) of the sensor may be configured to be responsive at around 1f Hz and the receiver (Rx) may be configured to be responsive at around 2f Hz. These configurations may be achieved with a multi-layer stack of ultrasonic transmitter and receiver layers or with an ultrasonic transmitter positioned on the opposite side of a sensor substrate layer than the receiver. In some implementations, the piezoelectric transmitter layer may have a different thickness or comprise a different piezoelectric material than the piezoelectric receiver layer. Alternatively, two-dimensional arrays of discrete sensor elements with a first portion tuned to transmit at 1f Hz and a second portion tuned to receive at 2f Hz or another multiple of the first frequency may be configured to achieve the bimodal response. Such results may be obtained if the fingerprint sensor system includes an array of PMUTs or CMUTs. FIG. 4C shows an example of a bimodal distribution where a highly response yet narrow bandwidth transmitter is used to generate the 1f Hz signals, whereas a wide bandwidth receiver is used to detect either or both 1f and 2f signals. FIG. 4D shows a bimodal sensor response from an ultrasonic transceiver that combines two separately-peaked transmit modes and receive modes with peaks near or at 1f Hz and 2f Hz, respectively. A bimodal sensor response is indicative of a two-resonator system, meaning that the natural resonance of the system has two modes with one near 1f and the other near 2f. When driving at or near the natural resonance, the system exhibits a bimodal response.

Figure 5A:
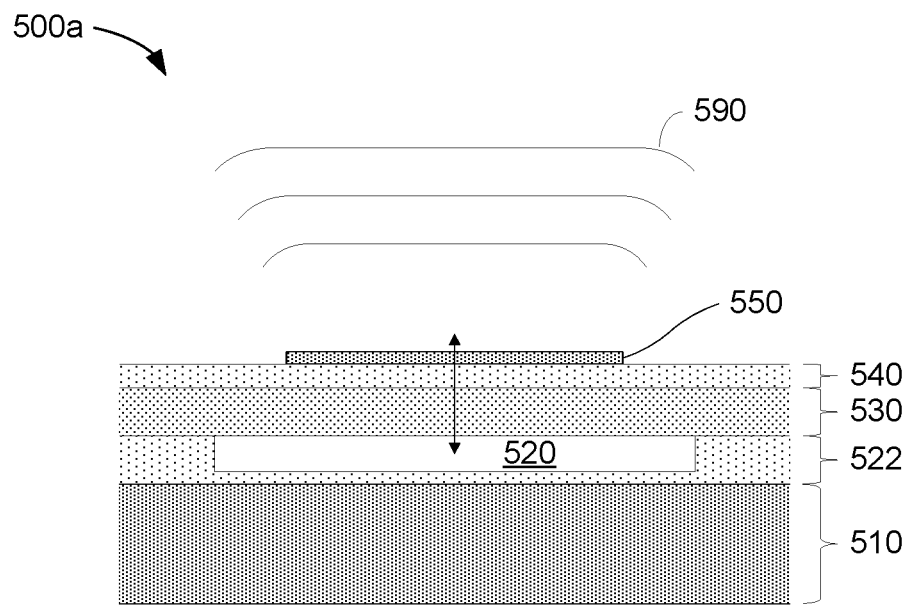
FIGS. 5A, 5B, and 5C show examples of sensors that may be configured to respond as shown in FIG. 4A, 4B, 4C or 4D.
Figure 5B:
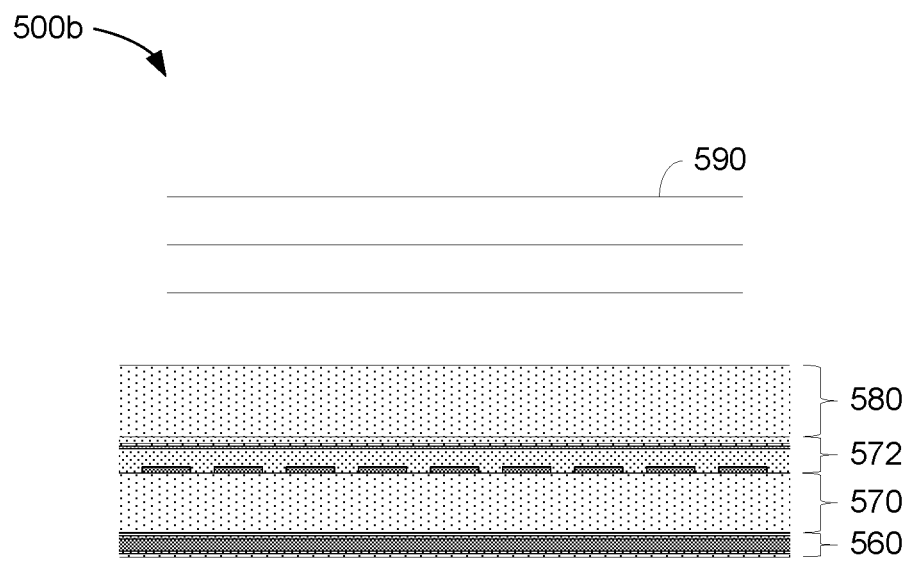
Figure 5C:
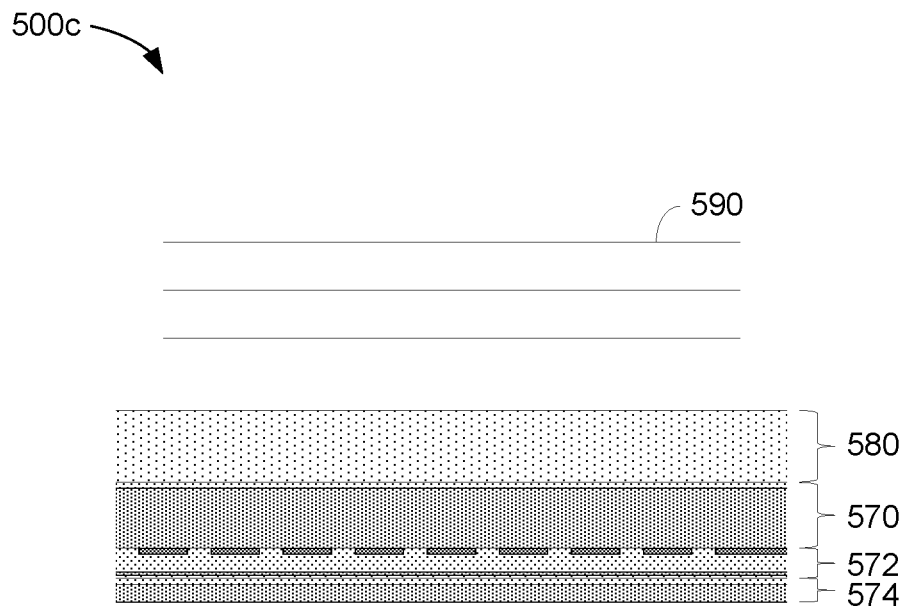
Figure 6:
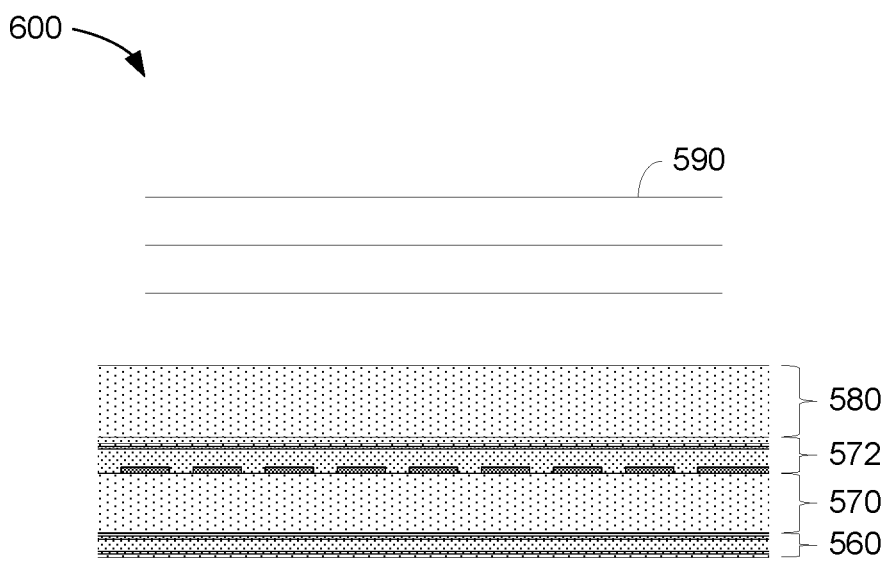
FIG. 6 depicts an exemplary polyvinylidene fluoride (PVDF) sensor or a copolymer (PVDF-TrFE) sensor that may be used to implement the examples of FIGS. 4A-4D.

FIGS. 5A, 5B, and 5C show examples of sensors that may be configured to respond as shown in FIG. 4A, 4B, 4C or 4D. FIG. 5A depicts a capacitive micromachined ultrasonic transducer (CMUT) as part of an ultrasonic sensor system 500a. Ultrasonic sensor system 500a includes a substrate layer 510, a vacuum cavity region 520 formed in a dielectric layer 522 above the substrate layer 510, a deformable structural layer 530 and dielectric layer 540 spanning the cavity region 520, and an upper electrode 550 disposed on the dielectric layer 540 to provide means for electrostatic excitation and vibrations of the structural layer 530 above the cavity region 520 to transmit and/or receive one or more ultrasonic waves 590. More detailed examples of a CMUT and a PMUT are described below with reference to FIGS. 7A and 7B. FIG. 5B depicts a portion of an ultrasonic sensor system 500b having a lead zirconate titanate (PZT) transmitter. In this configuration, a piezoelectric layer of PZT and associated electrodes on either side of the PZT layer is used as the ultrasonic transmitter 560, whereas a piezoelectric layer of polyvinylidene fluoride (PVDF) and associated electrodes and pixel circuitry disposed on a substrate layer 570 is used as the receiver 572. A platen layer 580 (such as a cover glass or a display module) may be included in the sensor stack. The PZT transmitter layer, in part due to its low loss and relatively high quality (Q) factor, may serve as a well-defined generator and transmitter of 1f ultrasonic waves, whereas the PVDF receiver layer with its wide bandwidth capability may serve as a suitable receiver of 1f and 2f reflected ultrasonic waves. FIG. 5C depicts a portion of an ultrasonic sensor system 500c having a silicon (Si) sensor including a silicon substrate layer 570 with pixel circuitry and a single-layer Tx/Rx receiver 572 with backing layers 574 that may include a flexible printed circuit (FPC, not shown) attached to the underside of a platen 580 utilizing the high bandwidth properties of a deposited or bonded piezoelectric layer to generate the 1f signals and to receive both 1f and 2f signals. FIG. 6 depicts a portion of an ultrasonic sensor system 600 with a polyvinylidene fluoride (PVDF) transmitter 560 and a PVDF or a copolymer (PVDF-TrFE) receiver 572 on a substrate layer 570 attached to a platen 580 that may be used to implement the examples of FIGS. 4A-4D. More detailed examples of ultrasonic sensors and ultrasonic sensor systems are provided below.

Figure 7A:
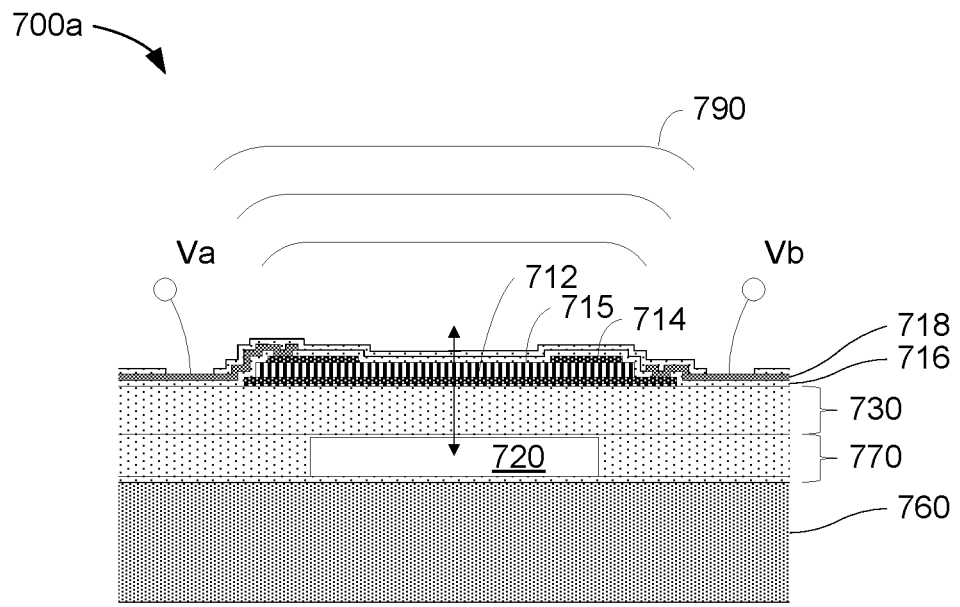
FIG. 7A shows an example of a piezoelectric micromachined ultrasonic transducer (PMUT) element.

FIG. 7A shows an example of a piezoelectric micromachined ultrasonic transducer (PMUT) element. The PMUT element 700a may, for example, be one PMUT element in an array of PMUT elements that are provided in a fingerprint sensor system. The PMUT element 700a may have one or more layers of piezoelectric material such as aluminum nitride (AlN) or lead zirconium titanate (PZT) in a piezoelectric layer that may be used to actuate the PMUT element to generate ultrasonic waves or to detect received ultrasonic waves. The piezoelectric layer stack may include a lower electrode layer 712, a piezoelectric layer 715, and an upper electrode layer 714, with the piezoelectric layer 715 sandwiched between at least a portion of the lower and upper electrodes 712 and 714. One or more dielectric layers 716 may provide electrical isolation for a metal interconnect layer 718, while allowing connections to lower and upper electrodes 712 and 714, respectively. The piezoelectric layer stack may be disposed on, below or above a mechanical layer 730. An anchor structure 770 may support the PMUT membrane or diaphragm that is suspended over a cavity 720 and a substrate 760. The substrate 760 may have TFT or silicon-based circuitry for driving and sensing the PMUT 700a and for generating a visual display. The piezoelectric layer stack and mechanical layer 730 may flex, bend or vibrate in response to drive voltages Va and Vb applied across the electrode layers 714 and 712, respectively. Vibrations of the PMUT element 700a may generate ultrasonic waves 790 at a frequency determined by the excitation frequency of the drive voltages. Ultrasonic waves striking the PMUT diaphragm may result in generation of sense voltages Va and Vb with flexing of the diaphragm. An underlying cavity 720 allows for deflections of the PMUT element 700a without contacting the underlying substrate 760. The operating frequencies of the PMUT elements 700a may be tailored for high-frequency operation, low-frequency operation, medium-frequency operation, or a combination of frequencies. According to some examples, the operating frequencies of the PMUT elements 700a may span both 1f and 2f, as shown in FIG. 4A. In other examples, the operating frequencies of some PMUT elements 700a may include 1f and the operating frequencies of other PMUT elements 700a may include 2f, as shown in FIG. 4B. In yet other examples, the operating frequencies and sensor response of portions of the PMUT elements 700a in an array of PMUT elements 700a may be tuned with different materials, different material thicknesses and/or different geometrical dimensions to achieve the sensor responses as shown in FIG. 4C and FIG. 4D.

Figure 7B:
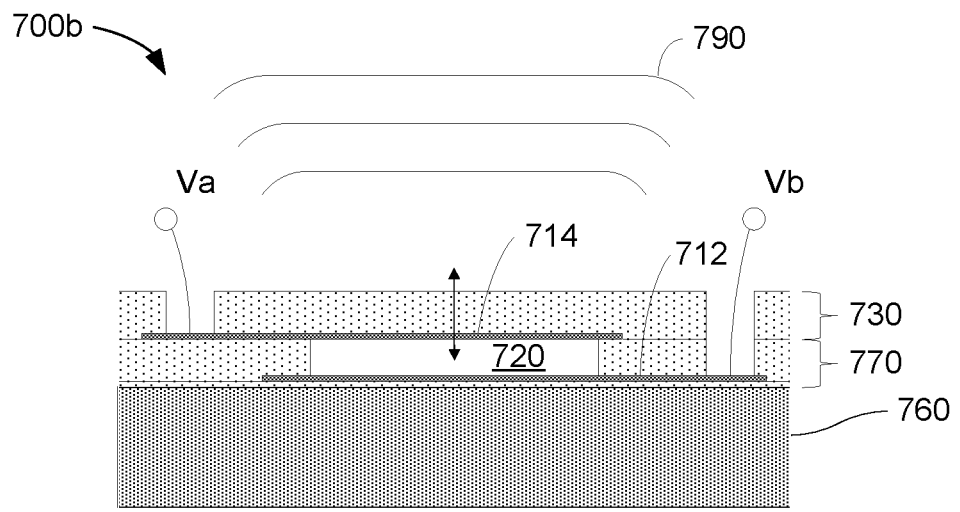
FIG. 7B shows an example of a capacitive micromachined ultrasonic transducer (CMUT) element.

FIG. 7B shows an example of a capacitive micromachined ultrasonic transducer (CMUT) element. The CMUT element 700b may, for example, be one CMUT element in an array of CMUT elements that are provided in a fingerprint sensor system. The CMUT element 700b may have a mechanical layer 730 supported above a cavity 720 and a substrate 760 by an anchor structure 770. Lower electrode 712 on the substrate below the cavity and upper electrode 714 above the cavity 720 may be driven with an excitation voltage applied to terminals Va and Vb to generate ultrasonic waves 790. A potential difference between electrodes 712 and 714 causes an electrostatic force to be generated that attracts the flexible diaphragm of CMUT element 700b downwards towards the substrate. As electrostatic forces are attractive in this configuration whether Va is larger than Vb or Vb is larger than Va, one of the electrodes may need to be biased at a relatively high DC voltage to allow small applied AC voltages to drive the diaphragm up and down. Biasing is also required for sensing deflections of the CMUT diaphragm above the cavity 720. According to some examples, the operating frequencies of the CMUT elements 700b may span both 1f and 2f, as shown in FIG. 4A. In other examples, the operating frequencies of some CMUT elements 700b may include 1f and the operating frequencies of other CMUT elements 700b may include 2f, as shown in FIG. 4B. In other examples, the operating frequencies and sensor response of portions of the CMUT elements 700b in an array of CMUT elements 700b may be tuned with different materials, different material thicknesses and/or different geometrical dimensions to achieve the sensor responses as shown in FIG. 4C and FIG. 4D.

PMUT element 700a, while somewhat more complex to fabricate than CMUT element 700b, generally requires smaller operating voltages than the CMUT element 700b to generate similar acoustic power. The PMUT element 700a does not suffer from consequential pull-in voltages for electrostatic devices such as CMUT element 700b, allowing a fuller range of travel. Furthermore, CMUT elements 700b may require significantly higher bias voltages to allow detection of incoming ultrasonic waves.

Figure 8:
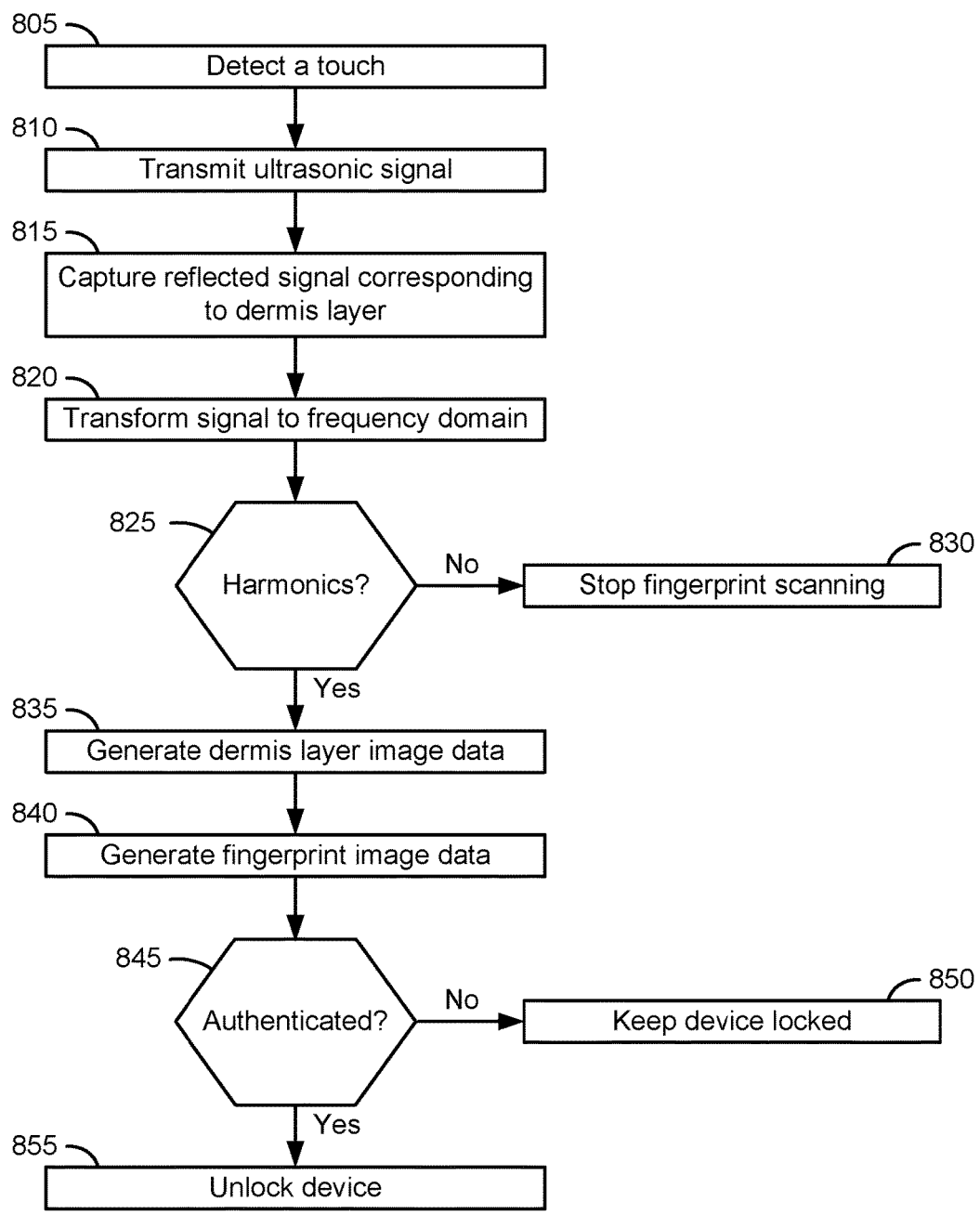
FIG. 8 is a flow diagram that depicts a method of authentication.

FIG. 8 is a flow diagram that depicts a method of authentication. In this example, block 805 involves detecting a touch on a device. According to some examples, in block 805 a touch may be detected when a finger is positioned on or near a touchscreen of a display of an electronic device. For example, a finger or other target object may be placed on the display and may be detected in some implementations using ultrasonic sensing, capacitive sensing or force sensing. However, in alternative examples, block 805 may involve detecting a touch in an area of a device other than a display such as a sidewall or backside of a device enclosure.

Next, at block 810, an ultrasonic signal may be transmitted. The ultrasonic signal may include a first frequency. For example, a piezoelectric ultrasonic transducer may have a transmitter made of piezoelectric material that may be configured to convert electrical excitation signals provided by a controller of a fingerprint sensor system into ultrasonic waves due to the deformation of the piezoelectric material in response to the electrical excitation signals. The ultrasonic wave may be at a power to penetrate into the dermis layer of a finger or to a corresponding depth of a non-finger target object.

Portions of the ultrasonic wave generated by the transmitter may be reflected back from the dermis layer of the finger or from a corresponding depth of a non-finger target object. For example, the piezoelectric ultrasonic transducer of the fingerprint sensor system may include several layers, such as a platen, coupling layers, electrodes, etc. As the ultrasonic wave propagates through these layers, reflected waves at the first frequency of the transmitted ultrasonic wave may be generated. Moreover, as the ultrasonic wave propagates to the epidermis, reflected waves at the first frequency of the transmitted ultrasonic wave also may be generated. However, when the ultrasonic wave propagates into the dermis layer of the finger, the reflected waves may include waves at the first frequency and at an integer multiple of the first frequency due to non-linear properties of human tissue. For example, as a wave propagates or travels through human tissue, the wave may be distorted and harmonics may be generated. According to some examples, the dermis layer may be within a depth range in which harmonics are at a maximum intensity, as ultrasonic waves at a higher frequency tend to attenuate more quickly in materials than waves at a lower frequency.

Accordingly, at block 815, reflected signals corresponding to at least the dermis layer of a finger, or the corresponding depth of a non-finger target object, may be captured. In some examples, reflected signals received from a portion of a target object within a time interval corresponding with the dermis layer may be captured in block 815. An acquisition time window of the fingerprint sensor system may be set according to the time interval corresponding with the dermis layer. According to some examples, block 815 also may involve obtaining fingerprint image data based on reflected portions of the ultrasonic wave received by the fingerprint sensor system within a time interval corresponding with fingerprints.

In block 820, at least a portion of the reflected signals that were captured in block 815 are transformed from the time domain into the frequency domain in this example. At block 825, it is determined whether the reflected signals that were captured in block 815 include "harmonic" signals at an integer multiple of the first frequency. According to some examples, block 825 may involve determining whether the magnitude of a peak of a signal at an integer multiple of the first frequency is above or below a harmonic threshold. If the magnitude is below the harmonic threshold or not within a range of harmonic thresholds representing live-finger magnitudes, this may indicate that the target object on the display is not a live finger, and therefore, at block 830, fingerprint scanning may be stopped. In some such implementations, a locked device may remain locked.

According to this example, if the peak of the signal at an integer multiple of the first frequency is above the harmonic threshold, at block 835 dermis layer image data may be generated. As noted elsewhere herein, the dermis layer image data may or may not be perceivable by a human as including an image. However, in some examples a human-perceivable image may be generated in block 835. For example, dermis layer image data may be generated to represent depth information (e.g., content within the dermis layer) of the fingerprint of the finger. Next, at block 840, fingerprint image data may be generated, for example, based on signals received before the acquisition time window for the dermis layer.

Next, at block 845, a fingerprint may be authenticated using the dermis layer image data and/or the fingerprint image data. For example, the data may be combined to generate a single image data (partial or full 3D image) providing details regarding the fingerprint and dermis layer of the finger. In another example, the fingerprint may be authenticated upon determining by the controller that the dermis layer image data represents a live finger and then based on that determination that the fingerprint image data corresponds to an authenticated fingerprint. If the fingerprint is not authenticated, then at block 850, the device may remain locked. By contrast, if the fingerprint is authenticated, then at block 855, the device may be unlocked.

Some implementations may use received harmonic signals, including but not limited to received harmonics of ultrasonic signals transmitted at a first frequency, for purposes other than liveness detection and/or authentication. In some such implementations, signals at one or more integer multiples of ultrasonic signals transmitted at a first frequency may be used for tissue imaging. The tissue imaging may include, but is not limited to, imaging of tissue in the dermis layer of a finger.

Compared to conventional imaging, imaging that uses one or more harmonics of a transmitted first frequency has several potential advantages. For example, such imaging may provide better resolution because the images can be created using higher frequencies than the transmitted first frequency. It might seem that one could obtain such higher resolution by simply transmitting at a desired higher frequency. However, because higher frequencies are attenuated more quickly than lower frequencies, it can be advantageous to have signals transmitted at a lower frequency and then use received higher-frequency harmonic signals for imaging. In this manner, the higher-frequency signals only need to propagate through the tissue layers and any intervening material one time instead of two times. Other advantages of harmonic imaging include the potential for deeper penetration, improved resolution, smaller side lobes, a narrower beam that provides better lateral resolution, better overall image contrast, and higher image quality.

Some implementations may use received subharmonic signals, including but not limited to received subharmonics of ultrasonic signals transmitted at a first frequency. In some such implementations, signals at one or more integer submultiples (such as one-half, one-third, etc.) of the first frequency may be used for imaging of a target object. Ultrasonic imaging using one or more subharmonics of the transmitted first frequency may reveal subtle details of the object being imaged, such as the presence of air bubbles, elastic spheroids, or other features than may generate subharmonics when compressed or expanded by a passing ultrasonic wave. For example, air or gas bubbles in the bloodstream may be detected and imaged with subharmonic imaging.

Figure 9:
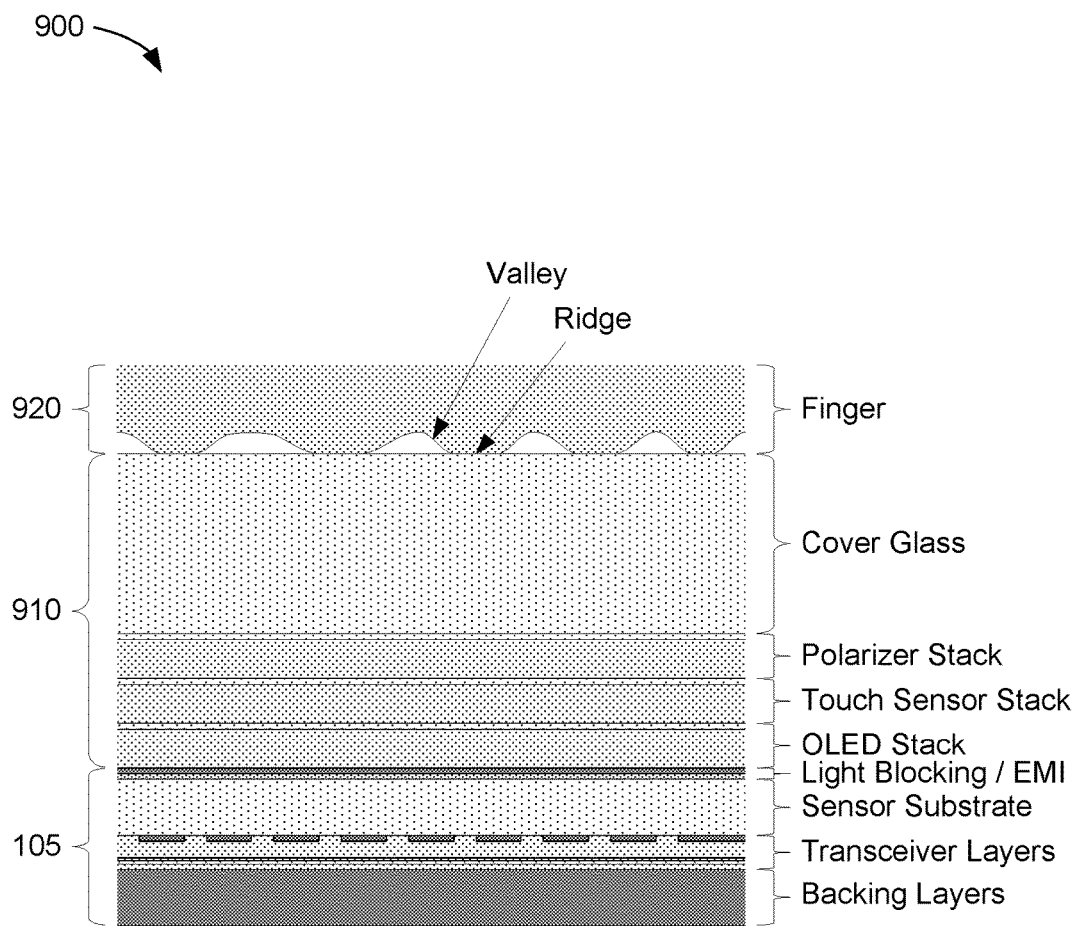
FIG. 9 shows an example of an apparatus that includes a fingerprint sensor system and an organic light-emitting diode (OLED) display stack.

FIG. 9 shows an example of an apparatus 900 that includes a fingerprint sensor system 105 and a portion of an organic light-emitting diode (OLED) display stack 910 in the acoustic path of the ultrasonic sensor system. As with other examples provided herein, the materials and dimensions shown in FIG. 9 are merely shown by way of example. In this example, the fingerprint sensor system is configured to obtain fingerprint image data and dermis layer image data from a target object 920 (such as a finger with ridges and valleys as shown in FIG. 9) that is placed on a cover glass or outer layer of the OLED display stack 910. In this example, the cover glass may be considered a platen of the fingerprint sensor system. The thickness of the display cover glass may vary, and is generally between about 400 µm thick and 800 µm thick. The cover glass may include anti-smudge layers and other protective coatings (not shown).

In this example, the OLED display stack includes various layers that may attenuate ultrasonic waves, particularly high-frequency ultrasonic waves. Such layers include, but are not limited to, optically clear adhesive (OCA) layers, layers in the polarizer stack, layers in the touch sensor stack, and layers in the OLED display stack. The fingerprint sensor system 105 may include light-blocking and EMI-protection layers, transceiver layers, and acoustic backing layers. If the fingerprint sensor system transmits ultrasonic waves at 2f and uses reflected waves at 2f for imaging, this may result in unacceptably levels of signal attenuation. This is true in part because the ultrasonic waves at 2f would need to traverse the OLED display stack twice. However, by transmitting ultrasonic waves at 1f and receiving ultrasonic waves at 2f, the ultrasonic waves at 2f only traverse the OLED display stack once.

Figure 10:
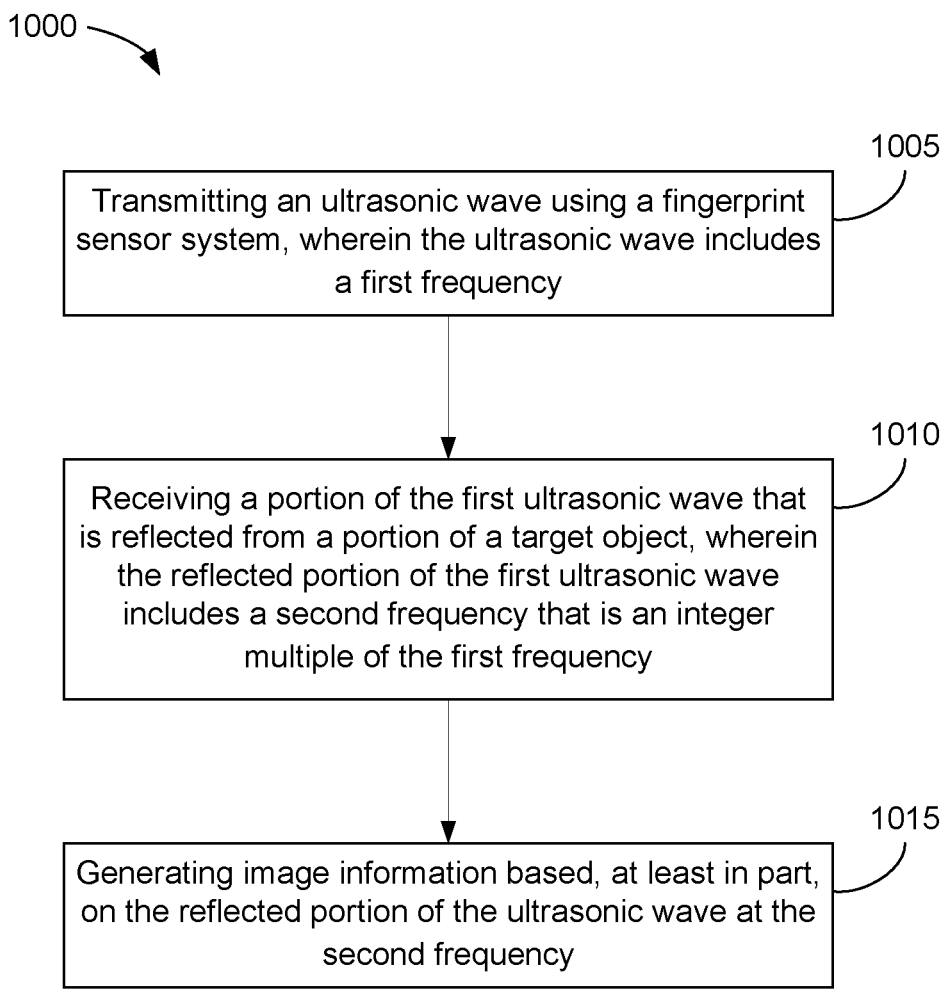
FIG. 10 is a flow diagram that provides examples of operations according to some disclosed methods.

FIG. 10 is a flow diagram that provides examples of operations according to some disclosed methods. The blocks of FIG. 10 (and those of other flow diagrams provided herein) may, for example, be performed by the apparatus 100 of FIG. 1, by the apparatus shown in FIG. 9, by a similar apparatus or by a system that includes one or more such devices. As with other methods disclosed herein, the method outlined in FIG. 10 may include more or fewer blocks than indicated. Moreover, the blocks of the method outlined in FIG. 10 are not necessarily performed in the order indicated.

Here, block 1005 involves transmitting an ultrasonic wave using a fingerprint sensor system. Block 205 may involve transmitting one or more ultrasonic waves by the fingerprint sensor system 105 shown in FIG. 1, or transmitting one or more ultrasonic waves by another type of fingerprint sensor system. The transmitting process may be controlled by a control system, such as the control system 110 of FIG. 1.

In this example, the ultrasonic wave(s) include a first frequency. For example, the ultrasonic wave(s) may include a range or band of frequencies that includes the first frequency. According to some examples, the first frequency may correspond to a frequency, or a frequency band, for a peak power of the transmitted ultrasonic wave(s).

According to this example, block 1010 involves receiving a portion of the first ultrasonic wave that is reflected from a target object. In this instance, the reflected portion of the first ultrasonic wave includes a second frequency that is an integer multiple of the first frequency.

According to this implementation, block 1015 involves generating image information based, at least in part, on the reflected portion of the ultrasonic wave at the second frequency. In some such implementations, block 1015 may involve generating image information that is perceivable by a human as one or more images. In some such examples, a control system may cause one or more images corresponding to the image information generated in block 1015 to be displayed on a display device.

Such implementations may be beneficial in various contexts, such as in an apparatus like that shown in FIG. 9. Some such systems may include a fingerprint sensor system and a control system capable of performing at least the blocks shown in FIG. 10. According to some implementations, the system also may include a platen and an organic light-emitting diode stack residing between the platen and the fingerprint sensor system. The platen may, for example, correspond with a cover glass of the OLED display stack. In some such examples, the target object may be positioned proximate or on an outer surface of the platen.

In some implementations, a control system may be configured to enhance the second frequency and/or to suppress the first frequency. For example, the control system may be configured to apply a filter to attenuate ultrasonic energy at the first frequency. In another example, the control system may be configured to process a series of acquired signals at different acquisition time delays (e.g., range-gate delays or RGDs) and relatively short acquisition time windows (e.g., range-gate windows or RGWs) to develop a time series and then operate on the time series to determine the spectral content and the magnitude(s) of the signals at the 2f frequency compared to the 1f frequency. In another example, the ultrasonic sensor system and associated control system may be configured to detect and locally store a series of two or more reflected signal strengths in the pixel circuitry, which may then be clocked out at a later time for harmonic analysis. In some implementations, the control system may be configured to ascertain and determine the signal content of the acquired signals at the 2f frequency using an FFT to convert the time-series information into the frequency domain.

Alternatively, or additionally, the control system may be configured to cause destructive interference with ultrasonic waves of the first frequency. For example, the first ultrasonic wave at the first frequency may have a first phase. The control system may be configured to transmit a second ultrasonic wave using the fingerprint sensor system to allow cancellation of ultrasonic waves of the first frequency and the first phase with the ultrasonic waves of the first frequency and the second phase. For example, the second ultrasonic wave may include the first frequency and the second ultrasonic wave may have a second phase that is opposite from the first phase (e.g., shifted by pi radians). In some implementations, a time delay may be inserted between transmitting the first ultrasonic wave and transmitting the second ultrasonic wave. The time delay may then appear between the first received ultrasonic signal and the second received ultrasonic signal. The two sequential ultrasonic waves with one having an inverted phase may therefore be appropriately synchronized by inserting the time delay accordingly into the first received ultrasonic signals to allow pipelined image processing. In some implementations, the time delay may be selected to allow the magnitude of reflected waves from the first transmission to subside below the noise level of the ultrasonic sensor array, which may be on the order of 10 microseconds or more.

Figure 11:
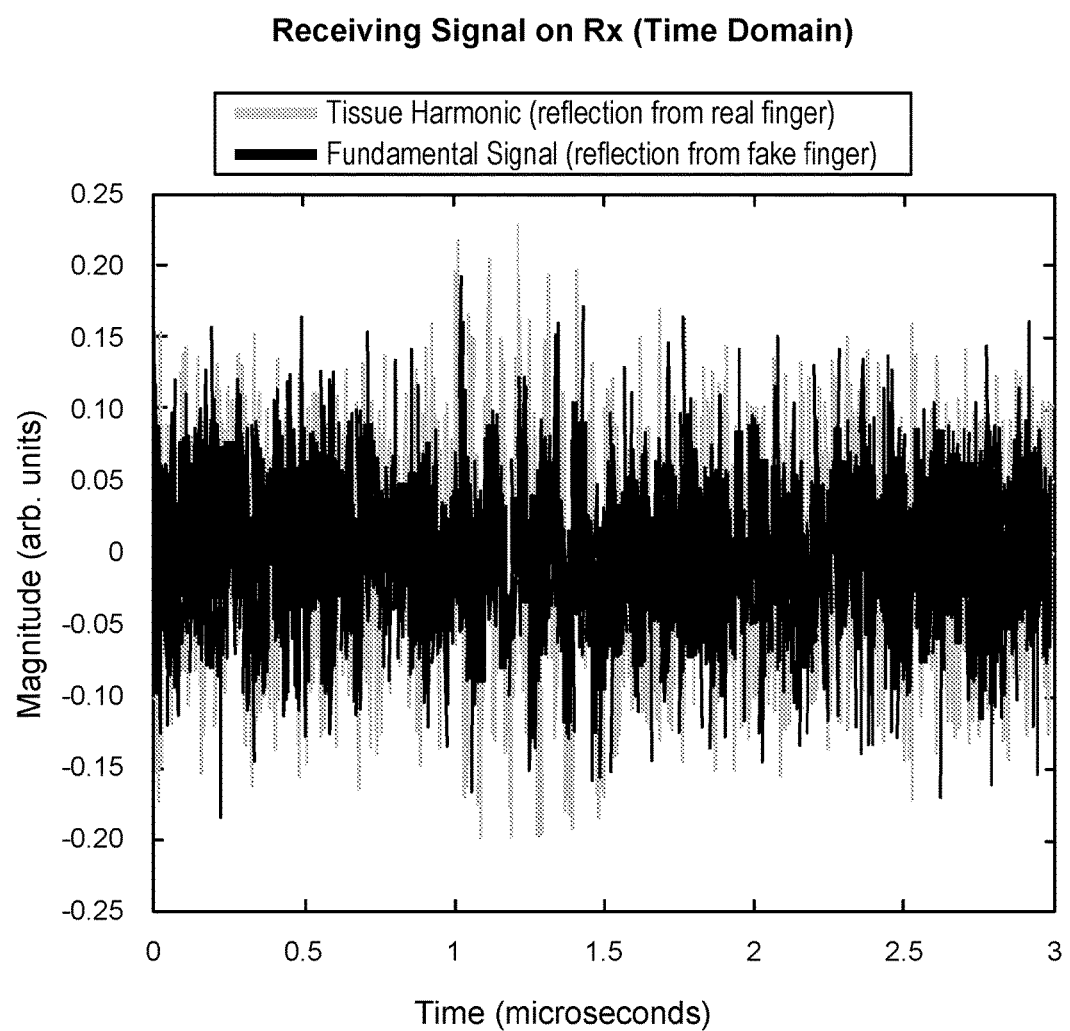
FIGS. 11 and 12 show examples of time domain and frequency domain signals received by an ultrasonic sensor system after reflection of an ultrasonic wave from a spoof finger and a real finger.
Figure 12:
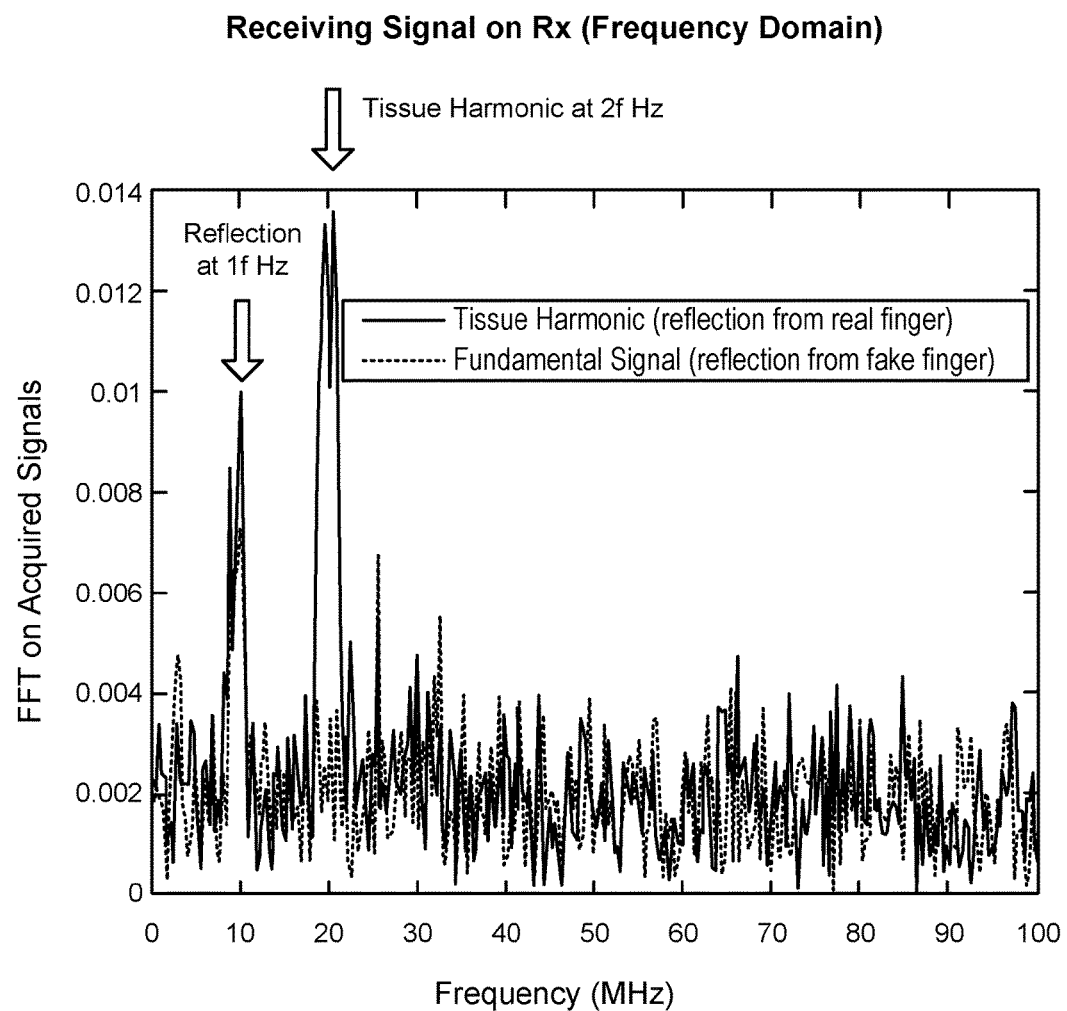

FIGS. 11 and 12 show examples of time domain and frequency domain signals received by an ultrasonic sensor system after reflection of an ultrasonic wave from a spoof finger and a real finger incorporating destructive interference with ultrasonic waves of the first frequency. FIG. 11 represents the received signals in the time domain. In FIG. 11, the combined received signals for two sequential transmissions of ultrasonic waves with opposite phases at the first frequency from a fake (e.g. "spoof") finger are shown in black, whereas signals received at the second frequency from a real (e.g. "live") finger are shown in gray. It may be seen in FIG. 11 that there is not a large difference between the magnitude of the two combined sequential signals from a spoof finger and from a live finger in the time domain.

FIG. 12 represents the received signals from FIG. 11 in the frequency domain. In this example, the signals represented in FIG. 11 were transformed into the frequency domain using an FFT and then represented in FIG. 12. In FIG. 12, the received signals from the real finger are shown in solid lines, whereas signals received from the fake finger are shown in stippled lines. It may be seen in FIG. 12 that the magnitude of the signals at 1f is diminished while that of 2f is doubled. Therefore, the signals at 2f may exceed the magnitude of the signals at 1f using this technique.

According to some examples, the control system may be configured to obtain dermis layer image data based on reflected portions of an ultrasonic wave received by the fingerprint sensor system. The dermis layer image data may correspond to ultrasonic waves received from the target object within a time interval corresponding with the dermis layer. The control system may be configured to determine whether a magnitude of the ultrasonic waves at the second frequency exceeds a harmonic threshold. This determination may be, or may be part of, a liveness detection process. The control system may be configured to not perform an authentication process if the control system determines that the magnitude does not exceed the harmonic threshold.

However, if the control system determines that the magnitude exceeds the harmonic threshold, the control system may be configured to perform an authentication process that is based, at least in part, on the dermis layer image data. In some implementations, the control system may be configured to obtain fingerprint image data based on reflected portions of the ultrasonic wave received by the fingerprint sensor system within a time interval corresponding with fingerprints. The authentication process may be based, at least in part, on both the fingerprint image data and the dermis layer image data.

According to some implementations, the control system may be configured to estimate a material nonlinearity parameter value of the target object. The authentication process and/or the liveness detection process may be based, at least in part, on the material nonlinearity parameter value.

Figure 13:
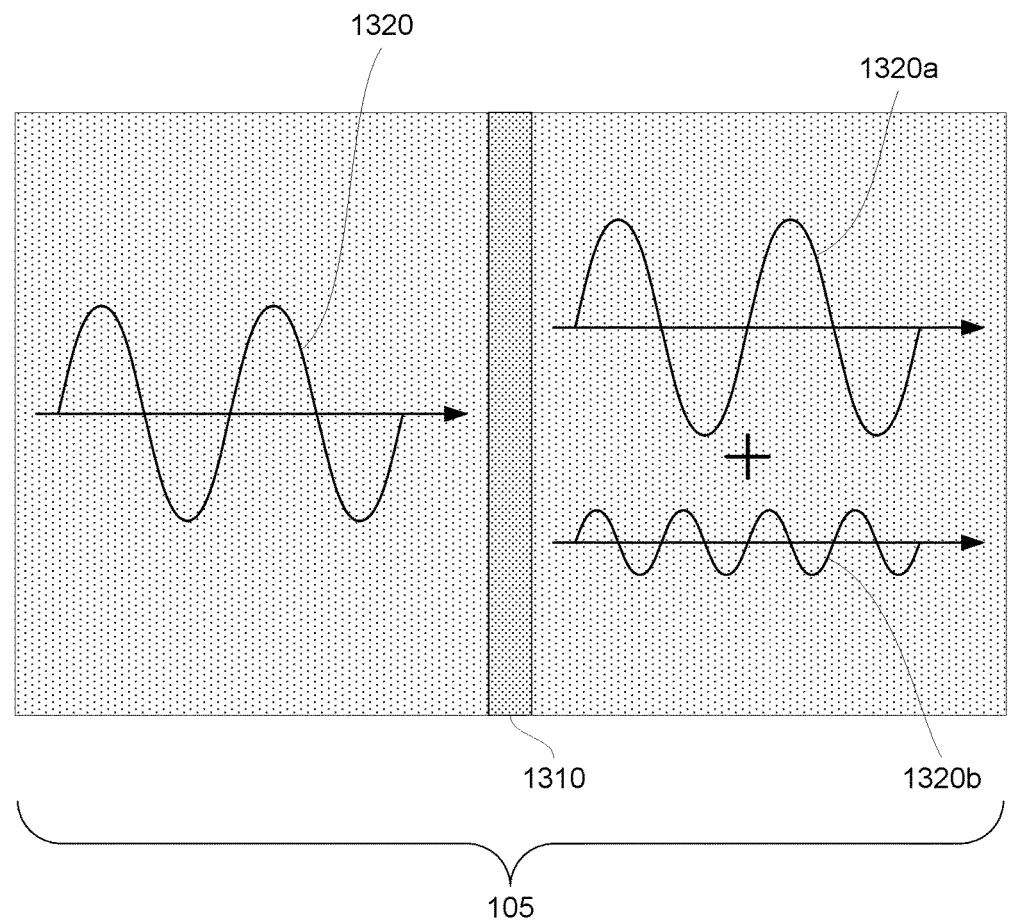
FIG. 13 illustrates an acoustic up-conversion layer in the acoustic path of an ultrasonic sensor system or an ultrasonic fingerprint sensor system.

FIG. 13 illustrates an acoustic up-conversion layer in the acoustic path of an ultrasonic sensor system or an ultrasonic fingerprint sensor system. The acoustic up-conversion layer 1310 comprises a synthetic or non-synthetic material having a significantly nonlinear elastic modulus that converts a portion of an incident ultrasonic wave 1320 of a first frequency (1f) traversing the layer into an emergent ultrasonic wave 1320a at the first frequency and emergent ultrasonic waves 1320b of a second frequency that are twice the frequency (2f) of the incident ultrasonic wave 1320. The 2f waves may then be used to image a portion of a target object with minimal impact from the 1f wave, which can be separated out by appropriate filtering or transforms by the control system 110. The 2f waves may be used for imaging the fingerprint or for imaging dermal layers in a target object such as a finger. Suitable up-conversion layers may include a soft polymer, a pliable adhesive layer, a layer of gel or hydrogel, or a liquid crystal material. In some implementations, the acoustic up-conversion layer 1310 may be included with the ultrasonic fingerprint sensor system 105 as described above with respect to FIG. 1. In some implementations, the acoustic up-conversion layer 1310 may be included in the OLED display stack 910 as described with respect to FIG. 9. In some implementations, the 2f waves emerging from the up-conversion layer 1310 may result in a further doubling of the frequency when impinging upon nonlinear materials such as biomaterials in the dermis. The reflected 2f and 4f waves may be processed to improve image resolution and in some implementations, improve the resolution of the 1f image information.

Figure 14A:
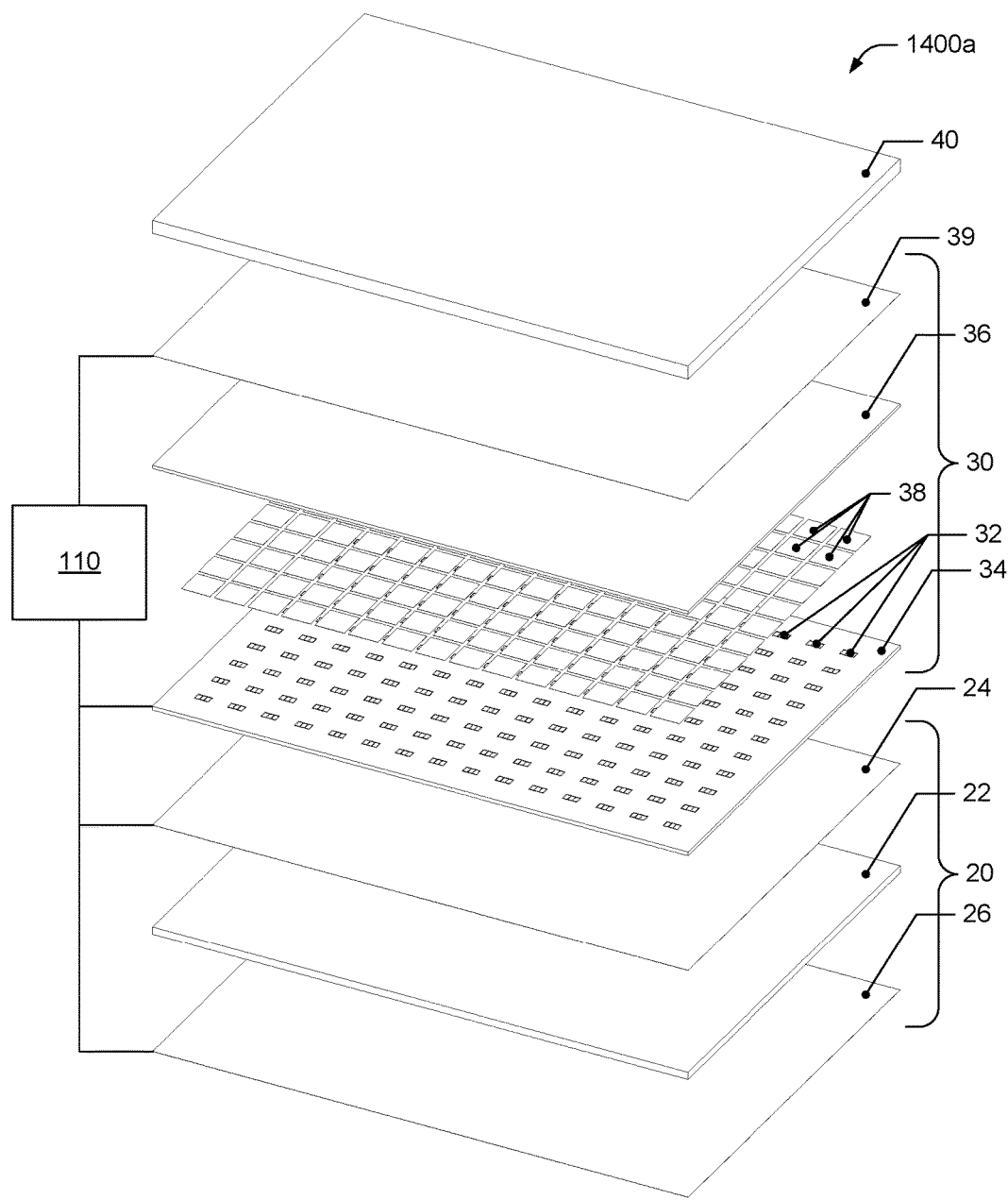
FIG. 14A shows an exploded view of an example of an ultrasonic sensor system.

FIG. 14A shows an exploded view of an example of an ultrasonic sensor system. In this example, the ultrasonic sensor system 1400a includes an ultrasonic transmitter 20 and an ultrasonic receiver 30 under a platen 40. According to some implementations, the ultrasonic transmitter 20, ultrasonic receiver 30 and platen 40 may be an example of the fingerprint sensor system 105 that is shown in FIG. 1 and described above. In some implementations, the ultrasonic transmitter 20 may be an example of the optional ultrasonic transmitter that is shown in FIG. 5B and FIG. 6 as described above. The ultrasonic transmitter 20 may include a substantially planar piezoelectric transmitter layer 22 and may be capable of functioning as a plane wave generator. Ultrasonic waves may be generated by applying a voltage to the piezoelectric layer to expand or contract the layer, depending upon the signal applied, thereby generating a plane wave. In this example, the control system 110 may be capable of causing a voltage that may be applied to the planar piezoelectric transmitter layer 22 via a first transmitter electrode 24 and a second transmitter electrode 26. In this fashion, an ultrasonic wave may be made by changing the thickness of the layer via a piezoelectric effect. This ultrasonic wave may travel towards a finger (or other object to be detected), passing through the platen 40. A portion of the wave not absorbed or transmitted by the object to be detected may be reflected so as to pass back through the platen 40 and be received by at least a portion of the ultrasonic receiver 30. The first and second transmitter electrodes 24 and 26 may be metallized electrodes, for example, metal layers that coat opposing sides of the piezoelectric transmitter layer 22.

The ultrasonic receiver 30 may include an array of sensor pixel circuits 32 disposed on a substrate 34, which also may be referred to as a backplane, and a piezoelectric receiver layer 36. In some implementations, each sensor pixel circuit 32 may include one or more TFT elements, electrical interconnect traces and, in some implementations, one or more additional circuit elements such as diodes, capacitors and the like. Each sensor pixel circuit 32 may be configured to convert surface charge generated in the piezoelectric receiver layer 36 proximate to the pixel circuit into an electrical signal. Each sensor pixel circuit 32 may include a pixel input electrode 38 that electrically couples the piezoelectric receiver layer 36 to the sensor pixel circuit 32.

In the illustrated implementation, a receiver bias electrode 39 is disposed on a side of the piezoelectric receiver layer 36 proximal to platen 40. The receiver bias electrode 39 may be a metallized electrode and may be grounded or biased to control which signals may be passed to the array of sensor pixel circuits 32. Ultrasonic energy that is reflected from the exposed (top) surface of the platen 40 may be converted into surface charge by the piezoelectric receiver layer 36. The generated surface charge may be coupled to the pixel input electrodes 38 and to the underlying sensor pixel circuits 32. The charge signal may be amplified or buffered by the sensor pixel circuits 32 and provided to the control system 110.

The control system 110 may be electrically connected (directly or indirectly) with the first transmitter electrode 24 and the second transmitter electrode 26, as well as with the receiver bias electrode 39 and the sensor pixel circuits 32 on the substrate 34. In some implementations, the control system 110 may operate substantially as described above. For example, the control system 110 may be capable of processing the signals received from the sensor pixel circuits 32.

The control system 110 may be capable of controlling the ultrasonic transmitter 20 and/or the ultrasonic receiver 30 to obtain ultrasonic image data, e.g., by obtaining fingerprint images. Whether or not the ultrasonic sensor system 1400a includes an ultrasonic transmitter 20, the control system 110 may be capable of obtaining attribute information from the ultrasonic image data. In some examples, the control system 110 may be capable of controlling access to one or more devices based, at least in part, on the attribute information. The ultrasonic sensor system 1400a (or an associated device) may include a memory system that includes one or more memory devices. In some implementations, the control system 110 may include at least a portion of the memory system. The control system 110 may be capable of obtaining attribute information from ultrasonic image data and storing the attribute information in the memory system. In some implementations, the control system 110 may be capable of capturing a fingerprint image, obtaining attribute information from the fingerprint image and storing attribute information obtained from the fingerprint image (which may be referred to herein as fingerprint image information) in the memory system. According to some examples, the control system 110 may be capable of capturing a fingerprint image, obtaining attribute information from the fingerprint image and storing attribute information obtained from the fingerprint image even while maintaining the ultrasonic transmitter 20 in an "off" state.

In some implementations, the control system 110 may be capable of operating the ultrasonic sensor system 1400a in an ultrasonic imaging mode or a force-sensing mode. In some implementations, the control system may be capable of maintaining the ultrasonic transmitter 20 in an "off" state when operating the ultrasonic sensor system in a force-sensing mode. The ultrasonic receiver 30 may be capable of functioning as a force sensor when the ultrasonic sensor system 1400a is operating in the force-sensing mode. In some implementations, the control system 110 may be capable of controlling other devices, such as a display system, a communication system, etc. In some implementations, the control system 110 may be capable of operating the ultrasonic sensor system 1400a in a capacitive imaging mode.

The platen 40 may be any appropriate material that can be acoustically coupled to the receiver, with examples including plastic, ceramic, sapphire, metal and glass. In some implementations, the platen 40 may be a cover plate, e.g., a cover glass or a lens glass for a display. Particularly when the ultrasonic transmitter 20 is in use, fingerprint detection and imaging can be performed through relatively thick platens if desired, e.g., 3 mm and above. However, for implementations in which the ultrasonic receiver 30 is capable of imaging fingerprints in a force detection mode or a capacitance detection mode, a thinner and relatively more compliant platen 40 may be desirable. According to some such implementations, the platen 40 may include one or more polymers, such as one or more types of parylene, and may be substantially thinner. In some such implementations, the platen 40 may be tens of microns thick or even less than 10 microns thick.

Examples of piezoelectric materials that may be used to form the piezoelectric receiver layer 36 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be utilized include polyvinylidene chloride (PVDC) homopolymers and copolymers, polytetrafluoroethylene (PTFE) homopolymers and copolymers, and diisopropylammonium bromide (DIPAB). In some implementations, other piezoelectric materials may be used in the piezoelectric transmitter layer 22 and/or the piezoelectric receiver layer 36, such as aluminum nitride (AlN) or lead zirconate titanate (PZT).

The thickness of each of the piezoelectric transmitter layer 22 and the piezoelectric receiver layer 36 may be selected so as to be suitable for generating and receiving ultrasonic waves. In one example, a PVDF piezoelectric transmitter layer 22 is approximately 28 µm thick and a PVDF-TrFE receiver layer 36 is approximately 12 µm thick. Example frequencies of the ultrasonic waves may be in the range of 5 MHz to 30 MHz, with wavelengths on the order of a millimeter or less.

Figure 14B:
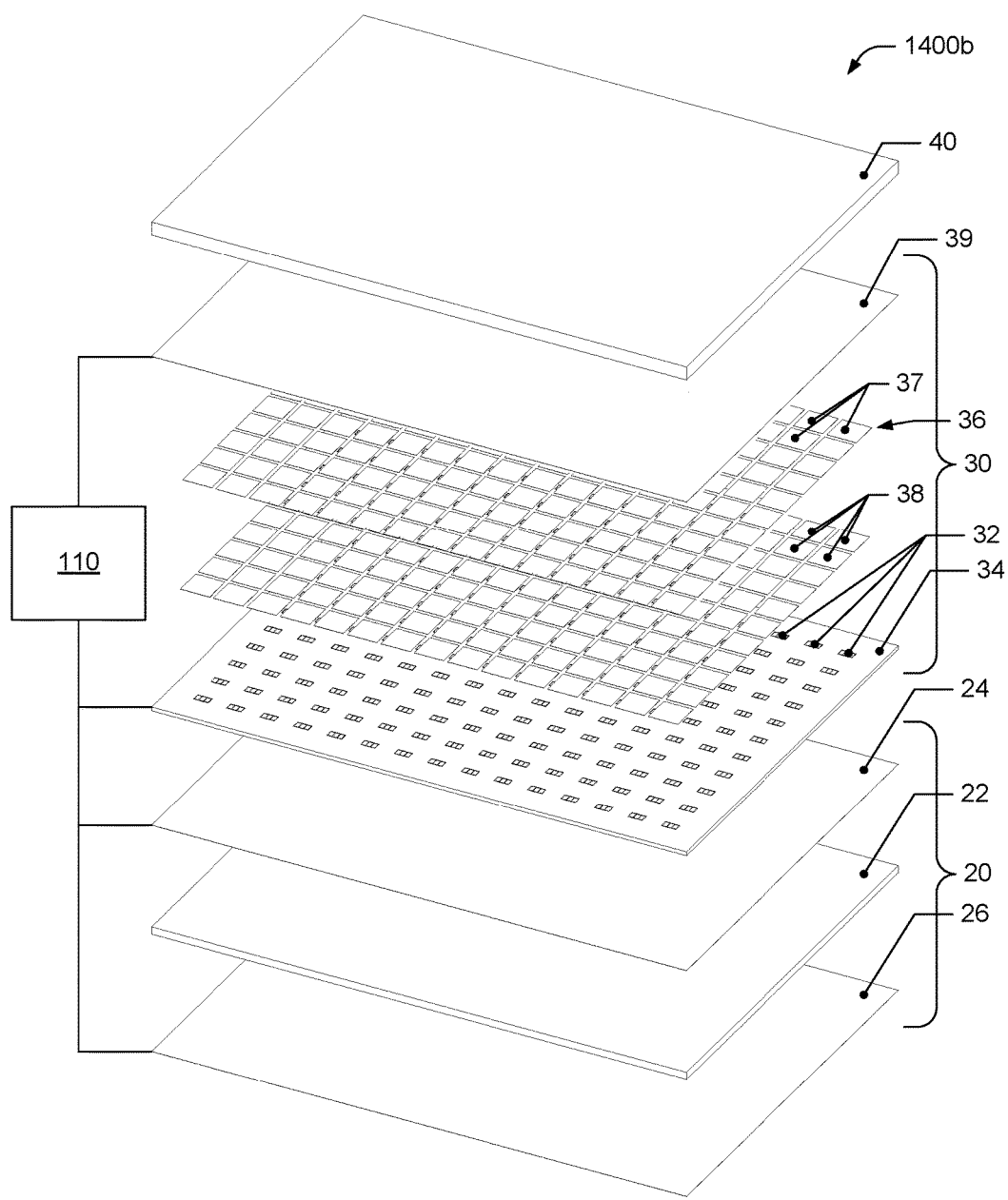
FIG. 14B shows an exploded view of another example of an ultrasonic sensor system.

FIG. 14B shows an exploded view of another example of an ultrasonic sensor system. In this example, the piezoelectric receiver layer 36 has been formed into discrete elements 37. In the implementation shown in FIG. 14B, each of the discrete elements 37 corresponds with a single pixel input electrode 38 and a single sensor pixel circuit 32. However, in alternative implementations of the ultrasonic sensor system 1400b, there is not necessarily a one-to-one correspondence between each of the discrete elements 37, a single pixel input electrode 38 and a single sensor pixel circuit 32. For example, in some implementations there may be multiple pixel input electrodes 38 and sensor pixel circuits 32 for a single discrete element 37.

FIGS. 14A and 14B show example arrangements of ultrasonic transmitters and receivers in an ultrasonic sensor system, with other arrangements being possible. For example, in some implementations, the ultrasonic transmitter 20 may be above the ultrasonic receiver 30 and therefore closer to the object(s) to be detected. In some implementations, the ultrasonic transmitter may be included with the ultrasonic sensor system (e.g., a single-layer transmitter and receiver). In some implementations, the ultrasonic sensor system may include an acoustic delay layer. For example, an acoustic delay layer may be incorporated into the ultrasonic sensor system between the ultrasonic transmitter 20 and the ultrasonic receiver 30. An acoustic delay layer may be employed to adjust the ultrasonic pulse timing, and at the same time electrically insulate the ultrasonic receiver 30 from the ultrasonic transmitter 20. The acoustic delay layer may have a substantially uniform thickness, with the material used for the delay layer and/or the thickness of the delay layer selected to provide a desired delay in the time for reflected ultrasonic energy to reach the ultrasonic receiver 30. In doing so, the range of time during which an energy pulse that carries information about the object by virtue of having been reflected by the object may be made to arrive at the ultrasonic receiver 30 during a time range when it is unlikely that energy reflected from other parts of the ultrasonic sensor system is arriving at the ultrasonic receiver 30. In some implementations, the substrate 34 and/or the platen 40 may serve as an acoustic delay layer.

Figure 14C:
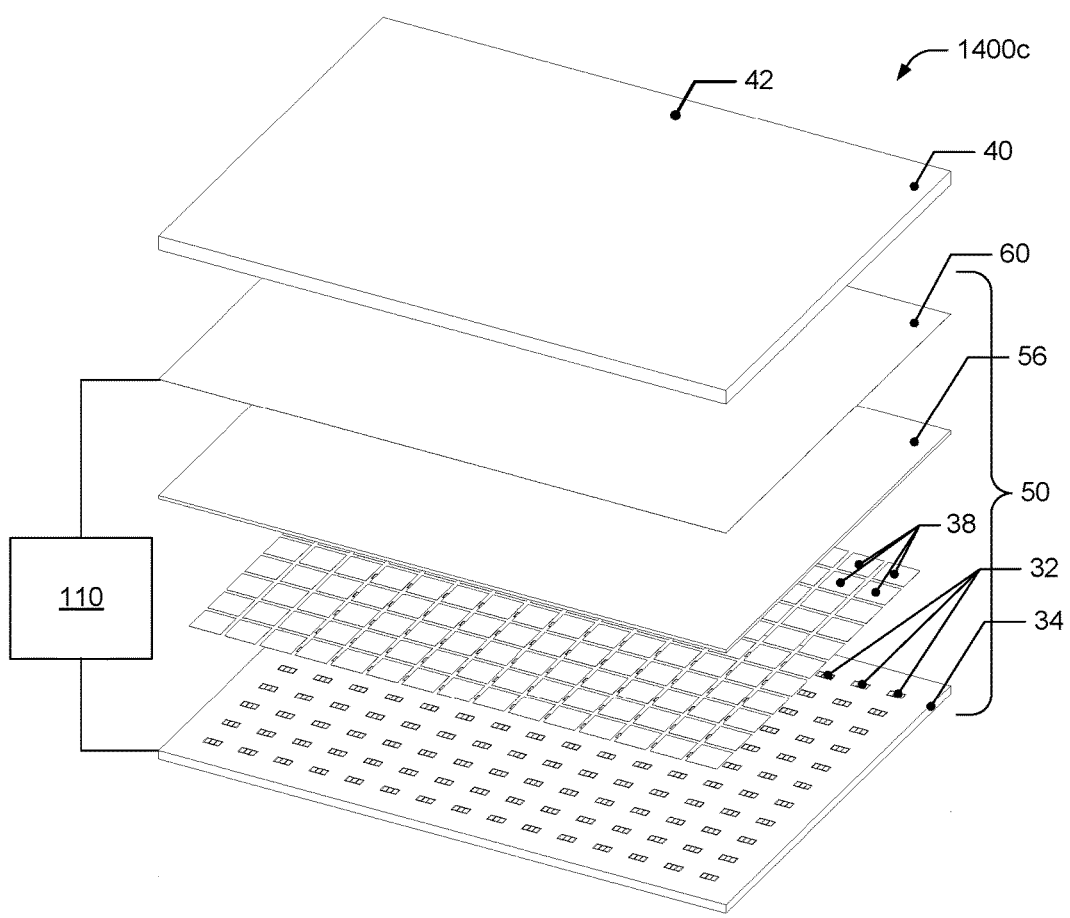
FIG. 14C shows an exploded view of example components of an ultrasonic transceiver array in an ultrasonic sensor system according to some implementations.

FIG. 14C shows an exploded view of example components of an ultrasonic transceiver array in an ultrasonic sensing system according to some implementations. In this example, the ultrasonic sensing system 1400c includes an ultrasonic transceiver array 50 under a platen 40. The ultrasonic transceiver array 50 may serve as the fingerprint sensor system 105 that is shown in FIG. 1 and described above. The ultrasonic transceiver array 50 may include a substantially planar piezoelectric transceiver layer 56 capable of functioning as a plane wave generator. Ultrasonic waves may be generated by applying a voltage across the piezoelectric transceiver layer 56. The control system 110 may be capable of generating a transceiver excitation voltage that may be applied across the piezoelectric transceiver layer 56 via one or more underlying pixel input electrodes 38 or one or more overlying transceiver bias electrodes 60. The generated ultrasonic wave may travel towards a finger or other object to be detected, passing through the platen 40. A portion of the wave not absorbed or transmitted by the object may be reflected so as to pass back through the platen 40 and be received by the ultrasonic transceiver array 50. The ultrasonic transceiver array 50 may serve as both an ultrasonic transmitter and an ultrasonic receiver using a single piezoelectric transceiver layer 56.

The ultrasonic transceiver array 50 may include an array of sensor pixel circuits 32 disposed on a sensor substrate 34. In some implementations, each sensor pixel circuit 32 may include one or more TFT- or silicon-based elements, electrical interconnect traces and, in some implementations, one or more additional circuit elements such as diodes, capacitors and the like. Each sensor pixel circuit 32 may include a pixel input electrode 38 that electrically couples the piezoelectric transceiver layer 56 to the sensor pixel circuit 32.

In the illustrated implementation, the transceiver bias electrode 60 is disposed on a side of the piezoelectric transceiver layer 56 proximal to the platen 40. The transceiver bias electrode 60 may be a metallized electrode and may be grounded or biased to control which signals may be generated and which reflected signals may be passed to the array of sensor pixel circuits 32. Ultrasonic energy that is reflected from the exposed (top) surface 42 of the platen 40 may be converted into surface charge by the piezoelectric transceiver layer 56. The generated surface charge may be coupled to the pixel input electrodes 38 and underlying sensor pixel circuits 32. The charge signal may be amplified or buffered by the sensor pixel circuits 32 and provided to the control system 110.

The control system 110 may be electrically connected (directly or indirectly) to the transceiver bias electrode 60 and the sensor pixel circuits 32 on the sensor substrate 34. In some implementations, the control system 110 may operate substantially as described above. For example, the control system 110 may be capable of processing the amplified or buffered electrical output signals received from the sensor pixel circuits 32.

The control system 110 may be capable of controlling the ultrasonic transceiver array 50 to obtain ultrasonic image data, which may include fingerprint image data and/or dermis layer image data or dermis image information. According to some implementations, the control system 110 may be capable of providing functionality such as that described herein, e.g., such as described herein with reference to FIGS. 1-13 and FIG. 15.

In other examples of an ultrasonic sensor system with an ultrasonic transceiver array, a backside of the sensor substrate 34 may be attached directly or indirectly to an overlying platen 40 that may be part of an OLED display stack. In operation, ultrasonic waves generated by the piezoelectric transceiver layer 56 may travel through the sensor substrate 34 and the platen 40, reflect off surface 42 of the platen 40, and travel back through the platen 40 and the sensor substrate 34 before being detected by sensor pixel circuits 32 on or in the sensor substrate 34.

Figure 15:
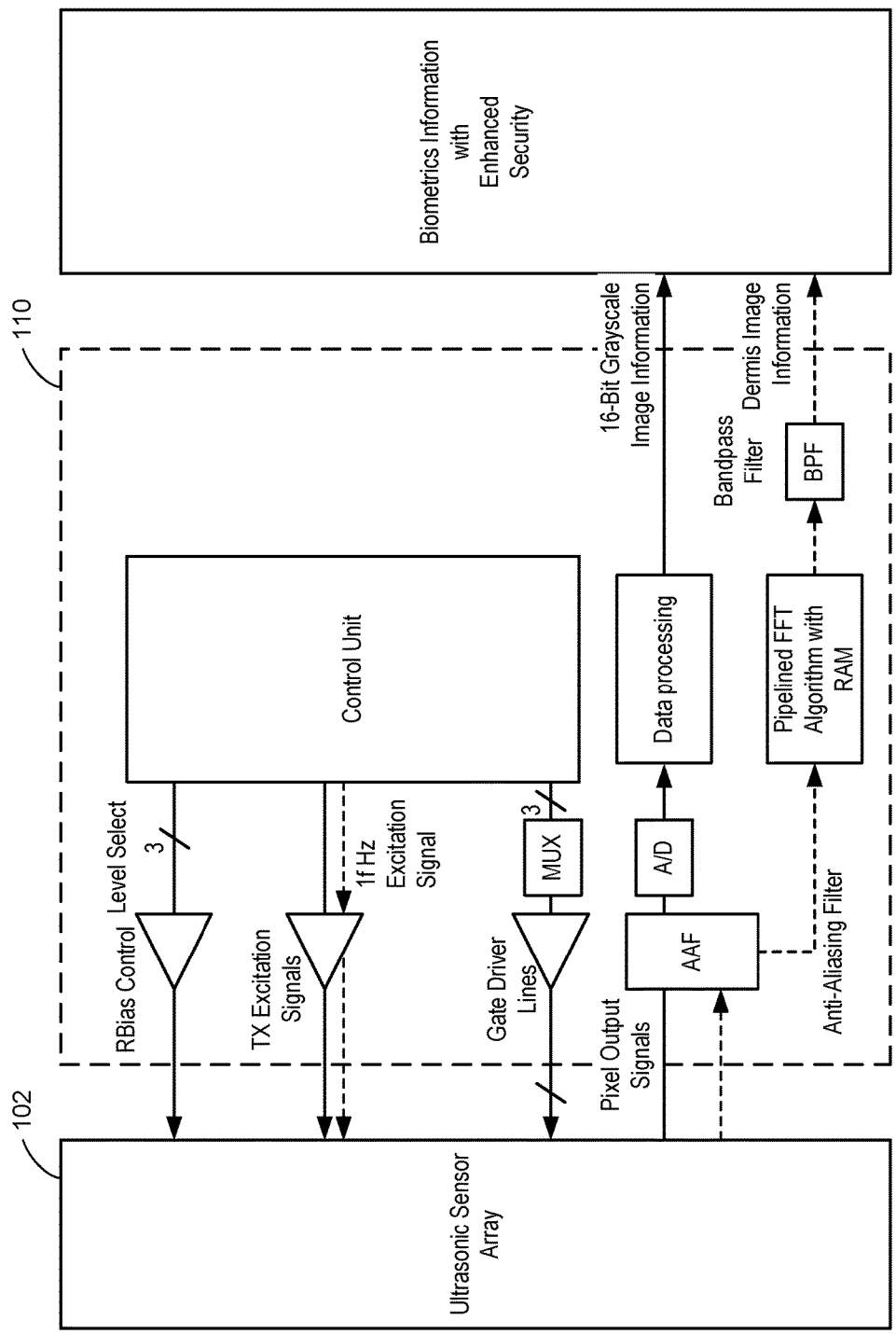
FIG. 15 shows an example of a control system that may be used to control an ultrasonic fingerprint sensor system.

FIG. 15 shows an example of a control system that may be used to control an ultrasonic fingerprint sensor system. As with other disclosed implementations, the particular elements, values, etc., that are indicated in FIG. 15 are merely shown by way of example. According to this example, the control system 110 may be coupled to an ultrasonic sensor array 102. The control system 110 may include a control unit and transmitter drive circuitry configured to drive the ultrasonic fingerprint sensor system in a range from about 5 MHz to about 20 MHz such as at 10 MHz, which is an example of the first frequency or 1f frequency as disclosed herein. In this example, the drive signals are transmitted to the ultrasonic sensor array 102, which is electrically connected to transmitters and receivers, or transceivers, of the ultrasonic fingerprint sensor system. In some implementations, the ultrasonic sensor array 102 may include TFT or silicon-based sensor pixel circuits, such as the sensor pixel circuits 32 that are shown in FIGS. 14A, 14B and 14C.

At least some of the transmitted ultrasonic waves may reflect from a target object. Some corresponding ultrasonic waves may be received by the ultrasonic fingerprint sensor system. Signals corresponding to the reflected ultrasonic waves may be received by a receiver array or a transceiver array of the ultrasonic fingerprint sensor system and passed on to the control system 110. In this example, the control system 110 includes an anti-aliasing filter for filtering the received signals prior to further processing.

In some implementations, the control system 110 may include one or more other filters that are configured to attenuate received signals in a frequency range that includes the 1f frequency. Here, for example, the control system 110 includes a bandpass filter that may be used to pass signals in a frequency range that includes 2f and to attenuate signals in a frequency range that includes 1f.

In this example, the control system 110 is configured to transform received signals from the time domain to the frequency domain. According to this implementation, the control system 110 is configured to perform a fast Fourier transform (FFT). The control system 110 may perform the FFT in the analog domain or in the digital domain, depending on the particular implementation. If performing an FFT with analog signals, the calculation may be completed faster although additional circuitry may be required on the ultrasonic sensor array and therefore some active sensor area for the ultrasonic sensor array may be lost. Accordingly, the ultrasonic sensor array 102 may, at least in some examples, be considered as part of the control system 110. If performing the FFT with digital signals, then more area for the ultrasonic sensor array 102 may be used for other applications, but the latency to perform the calculations may be increased. To incorporate the 1f phase inversion technique for cancelling the 1f signal with an inserted time delay and phase inversion of the second sequential wave as described with respect to FIG. 11 and FIG. 12 above, a storage device such as RAM may be paired with a finite state machine or microcontroller executing a suitable FFT algorithm such as a pipelined FFT algorithm within the control system 110 to perform the FFT on the received signal sequences and provide enhanced dermis image information.

As depicted in FIG. 15, the control system 110 is capable of providing grayscale images corresponding to signals received from the ultrasonic sensor array 102. In this example, the control system 110 is capable of providing 16-bit grayscale images, which may represent the fingerprint image data obtained from the ridges and valleys of the finger. In other implementations, the control system 110 may be configured to produce higher-resolution or lower-resolution images. In some examples, the control system 110 is capable of providing at least partial dermis image information, which may represent the dermis layer image data. Such dermis imaging may, in some instances, represent objects such as bone, blood vessels, etc., within the dermis layer of a finger.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module that may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. A system comprising:
a fingerprint sensor system; and
a control system configured to:
transmit an ultrasonic wave using the fingerprint sensor system, wherein the ultrasonic wave includes a first frequency;
obtain dermis layer image data from a portion of a target object based on reflected portions of the ultrasonic wave received by the fingerprint sensor system, the dermis layer image data corresponding to ultrasonic waves received from the portion of the target object within a time interval corresponding with the dermis layer, wherein the reflected portions of the ultrasonic wave corresponding to the dermis layer image data include ultrasonic waves at a second frequency that is an integer multiple of the first frequency;
determine whether a magnitude of the ultrasonic waves at the second frequency exceeds a harmonic threshold; and, if the control system determines that the magnitude exceeds the harmonic threshold,
perform an authentication process that is based, at least in part, on the dermis layer image data.

2. The system of claim 1, wherein the control system is configured to obtain fingerprint image data based on reflected portions of the ultrasonic wave received by the fingerprint sensor system within a time interval corresponding with fingerprints and wherein the authentication process is based, at least in part, on both the fingerprint image data and the dermis layer image data.

3. The system of claim 1, wherein the control system is configured to not perform the authentication process if the control system determines that the magnitude does not exceed the harmonic threshold.

4. The system of claim 1, wherein the fingerprint sensor system includes a high-bandwidth ultrasonic sensor system responsive to a frequency range corresponding to at least if Hertz (Hz) to 2f Hz or a bimodal narrow bandwidth ultrasonic sensor with a first frequency range including if Hz and a second frequency range including 2f Hz, while diminishing some frequencies between if Hz and 2f Hz, and wherein the 2f Hz frequency is twice the if Hz frequency.

5. The system of claim 4, wherein the first frequency range includes the first frequency and the second frequency range includes the second frequency.

6. The system of claim 1, wherein the fingerprint sensor system includes a piezoelectric transmitter layer capable of transmitting the ultrasonic wave at the first frequency and a piezoelectric receiver layer capable of receiving ultrasonic waves at the second frequency.

7. The system of claim 6, wherein a single piezoelectric layer serves as the transmitter layer and as the receiver layer.

8. The system of claim 1, wherein the control system is further configured to generate image information based, at least in part, on the ultrasonic waves at the second frequency.

9. The system of claim 1, wherein the control system is further configured to identify a peak time corresponding to a peak reflecting signal and wherein the time interval corresponding with the dermis layer is a time interval of 0.0 to 7.5 microseconds after the peak time.

10. The system of claim 1, wherein the control system is further configured to determine whether to unlock an electronic device based on an outcome of the authentication process.

11. The system of claim 1, wherein the control system is configured to estimate a material nonlinearity parameter value of the target object and wherein the authentication process is based, at least in part, on the material nonlinearity parameter value.

12. A system comprising:
a fingerprint sensor system; and
a control system configured to:
transmit a first ultrasonic wave using the fingerprint sensor system, wherein the first ultrasonic wave has a first phase and includes a first frequency;
transmit a second ultrasonic wave using the fingerprint sensor system, wherein the second ultrasonic wave includes the first frequency and wherein the second ultrasonic wave has a second phase that is opposite from the first phase;
receive a portion of the first ultrasonic wave that is reflected from a portion of a target object, wherein the reflected portion of the first ultrasonic wave includes a second frequency that is an integer multiple of the first frequency; and
generate image information based, at least in part, on the reflected portion of the first ultrasonic wave at the second frequency.

13. The system of claim 12, further comprising:
a platen; and
an organic light-emitting diode (OLED) display stack residing between the platen and the fingerprint sensor system.

14. The system of claim 13, wherein the target object is positioned on an outer surface of the platen.

15. The system of claim 12, wherein the control system is further configured to perform a fast Fourier transform to determine a magnitude of the received portion of the first ultrasonic wave at the second frequency.

16. The system of claim 12, wherein the control system is further configured to:
obtain dermis layer image data based on reflected portions of the first ultrasonic wave received by the fingerprint sensor system, the dermis layer image data corresponding to ultrasonic waves received from the target object within a time interval corresponding with the dermis layer;
determine whether a magnitude of the ultrasonic waves at the second frequency exceeds a harmonic threshold; and, if the control system determines that the magnitude exceeds the harmonic threshold,
perform an authentication process that is based, at least in part, on the dermis layer image data.

17. The system of claim 16, wherein the control system is configured to obtain fingerprint image data based on reflected portions of the first ultrasonic wave received by the fingerprint sensor system within a time interval corresponding with a fingerprint and wherein the authentication process is based, at least in part, on both the fingerprint image data and the dermis layer image data.

18. The system of claim 12, further comprising an acoustic up-conversion layer positioned in an acoustic path of the fingerprint sensor system.

19. The system of claim 13, wherein an acoustic up-conversion layer is included in the OLED display stack.

20. A method comprising:
  transmitting an ultrasonic wave using a fingerprint sensor system, wherein the ultrasonic wave includes a first frequency;
  obtaining dermis layer image data from a target object based on reflected portions of the ultrasonic wave received by the fingerprint sensor system, the dermis layer image data corresponding to ultrasonic waves received from the target object within a time interval corresponding with the dermis layer, wherein the reflected portions of the ultrasonic wave corresponding to the dermis layer image data include ultrasonic waves at a second frequency that is an integer multiple of the first frequency;
  determining whether a magnitude of the ultrasonic waves at the second frequency exceeds a harmonic threshold; and, if the magnitude exceeds the harmonic threshold,
  performing an authentication process that is based, at least in part, on the dermis layer image data.

21. The method of claim 20, further comprising obtaining fingerprint image data based on reflected portions of the ultrasonic wave received by the fingerprint sensor system within a time interval corresponding with a fingerprint, wherein the authentication process is based, at least in part, on both the fingerprint image data and the dermis layer image data.

22. The method of claim 20, wherein the time interval corresponding with the dermis layer is a time interval of 0.5 to 8.0 microseconds after generating the ultrasonic wave.

23. The method of claim 20, further comprising generating image information based, at least in part, on the ultrasonic waves at the second frequency.

24. The method of claim 20, further comprising estimating a material nonlinearity parameter value of the target object, wherein the authentication process is based, at least in part, on the material nonlinearity parameter value.

25. One or more non-transitory media having software stored thereon, the software including instructions for performing a method, the method comprising:
  transmitting a first ultrasonic wave using a fingerprint sensor system, wherein the first ultrasonic wave has a first phase and includes a first frequency;
  transmitting a second ultrasonic wave using the fingerprint sensor system, wherein the second ultrasonic wave includes the first frequency and wherein the second ultrasonic wave has a second phase that is opposite from the first phase;
  receiving a portion of the first ultrasonic wave that is reflected from a target object, wherein the reflected portion of the first ultrasonic wave includes a second frequency that is an integer multiple or an integer submultiple of the first frequency; and
  generating image information based, at least in part, on the reflected portion of the first ultrasonic wave at the second frequency.

26. The one or more non-transitory media of claim 25, wherein the method further comprises:
  obtaining dermis layer image data based on reflected portions of the first ultrasonic wave received by the fingerprint sensor system, the dermis layer image data corresponding to ultrasonic waves received from the target object within a time interval corresponding with the dermis layer;
  determining whether a magnitude of the ultrasonic waves at the second frequency exceeds a harmonic threshold; and, if the magnitude exceeds the harmonic threshold,
  performing an authentication process that is based, at least in part, on the dermis layer image data.

27. The one or more non-transitory media of claim 26, wherein the method further comprises obtaining fingerprint image data based on reflected portions of the first ultrasonic wave received by the fingerprint sensor system within a time interval corresponding with a fingerprint, wherein the authentication process is based, at least in part, on both the fingerprint image data and the dermis layer image data.

28. The one or more non-transitory media of claim 26, wherein the method further comprises estimating a material nonlinearity parameter value of the target object, wherein the authentication process is based, at least in part, on the material nonlinearity parameter value.

* * * * *